(12) United States Patent
Hoefer et al.

(10) Patent No.: US 7,398,826 B2
(45) Date of Patent: Jul. 15, 2008

(54) WELL TREATMENT WITH DISSOLVABLE POLYMER

(75) Inventors: Ann M. W. Hoefer, Houston, TX (US); Philip F. Sullivan, Bellaire, TX (US); Golchehreh Salamat, Sugar Land, TX (US); Curtis L. Boney, Houston, TX (US); Jesse C. Lee, Paris (FR); Yiyan Chen, Richmond, TX (US); Dean M. Willberg, Moscow (RU); Marina Bulova, Moscow (RU); Christopher N. Fredd, Missouri City, TX (US); Belgin Baser, Houston, TX (US); Timothy L. Pope, Bucharest (RO)

(73) Assignee: Schlumberger Technology Corporation, Sugar Land, TX (US)

( * ) Notice: Subject to any disclaimer, the term of this patent is extended or adjusted under 35 U.S.C. 154(b) by 300 days.

(21) Appl. No.: 11/316,021

(22) Filed: Dec. 21, 2005

(65) Prior Publication Data

US 2006/0157248 A1    Jul. 20, 2006

Related U.S. Application Data

(63) Continuation-in-part of application No. 11/159,023, filed on Jun. 22, 2005, now Pat. No. 7,219,731, which is a continuation-in-part of application No. 10/707,022, filed on Nov. 14, 2003, now Pat. No. 7,066,260.

(60) Provisional application No. 60/584,995, filed on Jul. 2, 2004.

(51) Int. Cl.
E21B 43/267 (2006.01)
E21B 43/22 (2006.01)
E21B 21/00 (2006.01)
C09K 8/80 (2006.01)
C09K 8/035 (2006.01)

(52) U.S. Cl. .............. 166/280.1; 166/283; 166/300; 166/302; 166/308.2; 175/72; 507/124; 507/132; 507/230; 507/245

(58) Field of Classification Search ............... 507/124, 507/230, 131, 132, 244, 245, 924; 166/280.1, 166/280.2, 281, 282, 283, 300, 302, 308.2; 175/72

See application file for complete search history.

(56) References Cited

U.S. PATENT DOCUMENTS 2,911,387 A * 11/1959 Vandenberg ............. 525/333.3

(Continued)

FOREIGN PATENT DOCUMENTS

| WO | 0049272 A1 | 8/2000 |
| WO | 2004/106698 A1 | 12/2004 |
| WO | 2006024995 A1 | 3/2006 |

OTHER PUBLICATIONS

U.S. Appl. No. 11/159,023—Degradable Additive for Viscoelastic Surfactant Based Fluid Systems, filed Jun. 22, 2005.

(Continued)

*Primary Examiner*—George Suchfield
(74) *Attorney, Agent, or Firm*—Thomas O. Mitchell; David Cate; Robin Nava

(57) ABSTRACT

Well treatment is disclosed that includes injecting a well treatment fluid with insoluble polyol polymer such as polyvinyl alcohol (PVOH) dispersed therein, depositing the insoluble polymer in the wellbore or an adjacent formation, and thereafter dissolving the polymer by reducing salinity and/or increasing temperature conditions in the environment of the polymer deposit. The method is disclosed for filter cake formation, fluid loss control, drilling, hydraulic fracturing and fiber assisted transport, where removal of the polyol at the end of treatment or after treatment is desired. The method is also disclosed for providing dissolved polyol as a delayed breaker in crosslinked polymer viscosified systems and viscoelastic surfactant systems. Also disclosed are well treatment fluids containing insoluble amorphous or at least partially crystalline polyol, and a PVOH fiber composition wherein the fibers are stabilized from dissolution by salinity.

23 Claims, 7 Drawing Sheets

U.S. PATENT DOCUMENTS

| | | | |
|---|---|---|---|
| 2,935,472 A * | 5/1960 | Klaas et al. | 507/104 |
| 3,051,545 A * | 8/1962 | Steuber | 264/182 |
| 3,272,749 A * | 9/1966 | Martin | 507/119 |
| 3,457,171 A * | 7/1969 | Flowers et al. | 210/653 |
| 3,868,998 A | 3/1975 | Lybarger et al. | |
| 3,872,018 A * | 3/1975 | Alexander | 507/111 |
| 3,960,736 A | 6/1976 | Free et al. | |
| 4,250,044 A | 2/1981 | Hinkel | |
| 4,387,769 A | 6/1983 | Erbstoesser et al. | |
| 4,526,695 A | 7/1985 | Erbstoesser et al. | |
| 4,702,848 A | 10/1987 | Payne | |
| 4,715,967 A | 12/1987 | Bellis et al. | |
| 4,848,467 A | 7/1989 | Cantu et al. | |
| 4,957,165 A | 9/1990 | Cantu et al. | |
| 4,961,466 A | 10/1990 | Himes et al. | |
| 4,969,526 A | 11/1990 | Cawiezel | |
| 4,986,355 A | 1/1991 | Casad et al. | |
| 5,036,919 A | 8/1991 | Thomas et al. | |
| 5,103,905 A | 4/1992 | Brannon et al. | |
| 5,501,275 A | 3/1996 | Card et al. | |
| 5,551,516 A | 9/1996 | Norman et al. | |
| 5,667,012 A | 9/1997 | Hoover et al. | |
| 5,782,300 A | 7/1998 | James et al. | |
| 5,929,002 A | 7/1999 | Joyce et al. | |
| 5,948,733 A | 9/1999 | Cawiezel et al. | |
| 5,964,295 A | 10/1999 | Brown et al. | |
| 5,979,555 A | 11/1999 | Gadberry et al. | |
| 5,979,557 A | 11/1999 | Card et al. | |
| 6,035,936 A | 3/2000 | Whalen | |
| 6,140,277 A | 10/2000 | Tibbles et al. | |
| 6,258,859 B1 | 7/2001 | Dahayanake et al. | |
| 6,394,185 B1 | 5/2002 | Constien | |
| 6,509,301 B1 | 1/2003 | Vollmer | |
| 6,617,285 B2 | 9/2003 | Crews | |
| 6,710,019 B1 * | 3/2004 | Sawdon et al. | 507/136 |
| 7,066,260 B2 * | 6/2006 | Sullivan et al. | 166/280.1 |
| 7,219,731 B2 * | 5/2007 | Sullivan et al. | 166/278 |
| 2003/0134751 A1 | 7/2003 | Lee et al. | |
| 2004/0127367 A1 | 7/2004 | Crews | |
| 2004/0152601 A1 | 8/2004 | Still et al. | |
| 2004/0216876 A1 | 11/2004 | Lee | |
| 2005/0034865 A1 | 2/2005 | Todd et al. | |
| 2005/0107265 A1 | 5/2005 | Sullivan et al. | |
| 2006/0032633 A1 | 2/2006 | Nguyen | |
| 2006/0113077 A1 | 6/2006 | Willberg et al. | |

OTHER PUBLICATIONS

U.S. Appl. No. 11/156,966—Degradable Fiber Systems for Stimulation, filed Jun. 20, 2005.

U.S. Appl. No. 10/707,022—Dissolving Filter Cake—filed Nov. 14, 2003.

Encylcopeida of Chemical Technology, 3rd Edition, vol. 23, John Wiley and Sons, pp. 848-865 (1983) By Kirk, R.E. and Othmer, D.F.

* cited by examiner

WELL TREATMENT WITH DISSOLVABLE POLYMER

CROSS REFERENCE TO RELATED APPLICATIONS

This invention is a continuation-in-part of U.S. patent application Ser. No. 11/159,023, filed Jun. 22, 2005 now U.S. Pat. No. 7,219,731, which claims the benefit of U.S. Provisional Patent Application Ser. No. 60/584,995, filed on Jul. 2, 2004; and U.S. patent application Ser. No. 11/159,023 is also a CIP of U.S. patent application Ser. No. 10/707,022, filed Nov. 14, 2003 now U.S. Pat. No. 7,066,260.

FIELD OF THE INVENTION

The invention relates to the treatment of oil and gas wells, more particularly to treatment methods and fluids utilizing a polymer that is at least partially insoluble in the treatment fluid during injection into the well and can be solubilized downhole for activation, inactivation or other functional modulation in the well treatment.

BACKGROUND OF THE INVENTION

In a wide range of well and formation treatment methods it is desirable to use various materials such as solids for downhole operations or procedures, and then later to remove or destroy the materials, after they have fulfilled their function, to restore properties to the wellbore and/or subterranean formations such as permeability for oil and gas production, or to activate the materials to fulfill a function such as a viscosity breaker or breaker aid.

Fluid loss control agents provide one example. When placing fluids in oilfield applications, fluid loss into the formation is a major concern. Fluid loss reduces the efficiency of the fluid placement with respect to time, fluid volume, and equipment. Thus, controlling fluid loss is highly desired. There are many oilfield applications in which filter cakes are needed in the wellbore, in the near-wellbore region or in one or more strata of the formation. Such applications are those in which, without a filter cake, fluid would leak off into porous rock at an undesirable rate during a well treatment. Such treatments include drilling, drill-in, completion, stimulation (for example, hydraulic fracturing or matrix dissolution), sand control (for example gravel packing, frac-packing, and sand consolidation), diversion, scale control, water control, and others. When the filter cake is within the formation it is typically called an "internal" filter cake; otherwise it is called an "external" filter cake. Typically, after these treatments have been completed the continued presence of the filter cake is undesirable or unacceptable.

Conventional water-based drilling and completion fluids, for example, often rely on polymers to provide viscosity and fluid loss control. This approach requires acid, oxidizer or enzyme to remove polymer residue and filter cake buildup, to reduce the extent of formation damage. It is, for example, a common practice for drilling fluid to use sized calcium carbonate as a bridging agent, in which case acid plus a corrosion inhibitor package is subsequently required for filter cake removal. The overall drilling/completion strategy based on polymer fluids is often operationally cumbersome, can lack long-term stability, can employ corrosive chemicals, and/or can be prone to cause formation damage.

Hydraulic fracturing, gravel packing, or fracturing and gravel packing in one operation (called, for example frac and pack or frac-n-pack, or frac-pack treatments), are used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore. Gravel is also a natural or synthetic material, which may be identical to, or different from, proppant. Gravel packing is used for "sand" control. Sand is the name given to any particulate material, such as clays, from the formation that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed. Therefore, hydraulic fracturing treatments in which short, wide fractures are wanted are often combined in a single continuous ("frac and pack") operation with gravel packing. For simplicity, reference may be made below to any one of hydraulic fracturing, fracturing and gravel packing in one operation (frac and pack), or gravel packing, and include them all; the term "proppant" may likewise refer to and include gravel and the term "gravel" proppant.

Solid, substantially insoluble, or sparingly or slowly soluble materials (that may be called fluid loss additives and/or filter cake components) are typically added to the fluids used in these treatments to form filter cakes, although sometimes soluble (or at least highly dispersed) components of the fluids (such as polymers or crosslinked polymers) may form some or all of the filter cakes. Removal of the filter cake is typically accomplished either by a mechanical means (scraping, jetting, or the like), by subsequent addition of a fluid containing an agent (such as an acid, a base, an oxidizer, or an enzyme) that dissolves at least a portion of the filter cake, or by manipulation of the physical state of the filter cake (by emulsion inversion, for example). These removal methods usually require a tool or addition of another fluid (for example to change the pH or to add a chemical). This can sometimes be accomplished in the wellbore but normally cannot be done in a proppant or gravel pack. Sometimes the operator may rely on the flow of produced fluids (which will be in the opposite direction from the flow of the fluid when the filter cake was laid down) to loosen the filter cake or to dissolve at least a part of the filter cake (for example if it is a soluble salt). However, these methods require fluid flow and often result in slow or incomplete filter cake removal. Sometimes a breaker can be incorporated in the filter cake but these must normally be delayed (for example by esterification or encapsulation) and they are often expensive and/or difficult to place and/or difficult to trigger.

In hydraulic fracturing, a first, viscous fluid called a "pad" is typically injected into the formation to initiate and propagate the fracture and often to contribute to fluid loss control. The choice of the pad fluid depends upon the nature of the subsequently injected fluid, the nature of the formation, and the desired results and attributes of the stimulation job. This is typically followed by a second fluid designed primarily to carry the proppant that keeps the fracture open after the pumping pressure is released. Occasionally, hydraulic fracturing is done with a second fluid that is not highly viscosified; this choice is made primarily to save chemical costs and/or as a way to reduce the deleterious effect of polymers described below. This technique, sometimes called a "water-frac" involves using extremely low polymer concentrations, so low that they cannot be effectively crosslinked, throughout the job. This alternative has a major drawback: since there is inadequate viscosity to carry much proppant, high pump rates must be used and only very small concentrations of proppant (pounds mass proppant added per gallon of fluid ("PPA")) can be used. Very little proppant will be placed in the fracture to keep it open after the pumping is stopped.

Pads and fracturing or gravel packing fluids are usually viscosified in one of three ways. If the injected fluid is an oil, it is gelled with certain additives designed for the purpose, such as certain aluminum and phosphate compounds. If the fluid is water or brine, for hydraulic or acid fracturing, it is gelled with a polymer (usually a polysaccharide like guar, usually crosslinked with a boron, zirconium or titanium compound), or with a viscoelastic surfactant fluid system ("VES") that can be formed using certain surfactants that form appropriately sized and shaped micelles. VES's are popular because they leave very clean proppant or gravel packs, but they do not form a filter cake by themselves. Polymers, especially crosslinked polymers, often tend to form a "filter cake" on the fracture face, that is, they coat out on the fracture face as some fluid leaks off, provided that the rock pores are too small to permit entry of the polymer or crosslinked polymer. Some filter cake is generally desirable for fluid loss control. This process of filter cake formation is also called wallbuilding. VES fluids without fluid loss additives do not form filter cakes as a result of leak-off. VES leak-off control, in the absence of fluid loss additives, is viscosity controlled, i.e., the resistance due to the flow of the viscous VES fluid through the formation porosity limits the leak-off rate. The viscosity controlled leak-off rate can be high in certain formation permeabilities because the highly shear-thinning fluid has a low apparent viscosity in high flow velocity areas. Reducing the flow velocity (by correspondingly reducing the pressure gradient or simply as a result of the same injected volumetric flow rate leaking off into the formation through a greater surface area as the fracture grows in length and height) will allow micelle structure to reassemble and will result in regeneration of viscosity and fluid loss control. Fluid loss control may not always be optimal with VES systems, especially in higher permeability formations. On the other hand, polymers have two major deficiencies: a) the filter cake, if left in place, can impede subsequent flow of hydrocarbons into the fracture and then into the wellbore, and b) polymer or crosslinked polymer will be left in the fracture itself, impeding or cutting off flow, either by physically blocking the flow path through the proppant pack or by leaving a high viscosity fluid in the fracture. VES fluids do not form a filter cake or leave solids in the fracture. VES fluids, therefore, leave a cleaner, more conductive and, therefore, more productive fracture than polymer-based fluids. They are easier to use because they require fewer components and less surface equipment, but they may be less efficient (in terms of fluid loss) than polymers, depending upon the formation permeability and the specific VES system. It would be desirable to make use of VES fluid systems more efficient in terms of fluid loss.

To overcome high fluid loss in polymeric and VES-based fluids (in particular in hydraulic fracturing fluids, gravel carrier fluids, and fluid loss control pills), various fluid loss control additives have been proposed. Silica, mica, and calcite, alone, in combination, or in combination with starch, are known to reduce fluid loss in polymer-based fracturing fluids, by forming a relatively water-impermeable filter cake on the formation face, as described in U.S. Pat. No. 5,948,733. Use of these fluid loss control additives alone in a VES-based fluid, however, has been observed to give only modest decreases in fluid loss, as described in U.S. Pat. No. 5,929,002. The poor performance of these conventional fluid loss additives is typically attributed to the period of high leak-off (spurt) before a filter cake is formed and to the formation of a filter cake permeable to the VES-based fluid.

Instead of conventional fluid loss additives and filter cake formation, it is known to treat a subterranean formation by pumping a colloidal suspension of small particles in a viscoelastic surfactant fluid system; see for example U.S. Patent Application Publication No. 2005-0107265 assigned to the assignee of the present application. The colloidal suspension and the viscoelastic surfactant interact to form structures that effectively bridge and block pore throats. Colloidal suspensions are typically dispersions of discrete very small particles, spherical or elongated in shape, charged so that the repulsion between similarly charged particles stabilizes the dispersion. Disturbance of the charge balance, due for instance to removing water, changing the pH or adding salt or water-miscible organic solvent, causes the colloidal particles to aggregate, resulting in the formation of a gel. These particles are typically less than 1 micron in size, and typically in the range of from about 10 to about 100 nanometers. The dispersion is prepackaged as a liquid, transparent in the case of relatively low concentrations of particles, becoming opalescent or milky at higher concentrations. In any case, the dispersion may be handled as a liquid, which greatly simplifies the dosage.

The use of a hydrolysable polyester material for use as a fluid loss additive for fluid loss control has previously been proposed for polymer-viscosified fracturing fluids. After the treatment, the fluid loss additive degrades and so contributes little damage. Further, degradation products of such materials have been shown to cause delayed breaking of polymer-viscosified fracturing fluids. U.S. Pat. No. 4,715,967 discloses the use of polyglycolic acid (PGA) as a fluid loss additive to temporarily reduce the permeability of a formation. SPE paper 18211 discloses the use of PGA as a fluid loss additive and gel breaker for crosslinked hydroxypropyl guar fluids. U.S. Pat. No. 6,509,301 describes the use of acid forming compounds such as PGA as delayed breakers of surfactant-based vesicle fluids, such as those formed from the zwitterionic material lecithin. The preferred pH of these materials is above 6.5, more preferably between 7.5 and 9.5.

Since VES fluid systems cause negligible damage, it would be desirable to use a fluid loss additive that is compatible with the VES system and also causes negligible damage. The use of polyglycolic acid and similar materials as a fluid loss additive for VES fluid systems is described in U.S. patent application Ser. No. 11/159,023, filed Jun. 22, 2005, hereby incorporated herein by reference in its entirety. Briefly, polyglycolic acid and similar materials most often degrade by a mechanism of hydrolysis, catalyzed by acid or base. However, these fluid loss additive materials, as commercially obtained, often contain small amounts of acid or they start to hydrolyze to form acids when the fluids are first mixed or injected. To prevent the deleterious effects of these factors, a base or buffer was included in the fluid.

In some cases viscous fluids are used in treatments in which some or all of the fluid may be allowed to invade the formation, in which case a component is needed that is a breaker but not necessarily a fluid loss additive.

In the placement of tip screen out (TSO) fracturing treatments, it is desirable to include a fluid loss agent (FLA) to place a temporary filter cake on the faces of the fracture in the early part of the treatment, e.g., during the pad stage. Ideally, this filter cake would then be destroyed in the later stages of the treatment so that increased fluid loss during the proppant stages will allow a tip screen out to occur. The end result is a short but wide fracture with a high proppant concentration. The FLA is usually injected into the fracture with the initial pad volume used to initiate hydraulic fracturing. After the pad is injected, proppant slurry, that may also contain an FLA, is pumped into the fracture in various stages depending on job design. The proppant is designed to hold the fracture open and allow reservoir fluid to flow through the proppant pack. The proppant slurry generally includes a viscous carrier fluid to keep the proppant from prematurely dropping out of the slurry. After the proppant has been placed in the fracture, the pressure is released and the fracture closes on the proppant. However, it is necessary to remove or break both the viscosifier in the carrier fluid and the filter cake (that may contain concentrated polymer) so that reservoir fluids can thereafter flow into the fracture and through the proppant pack to the wellbore and the production string.

Conventional fracture design is well known in the art. See, e.g., U.S. Pat. No. 5,103,905, Method of Optimizing the Conductivity of a Propped Fractured Formation, assigned to Schlumberger.

Fracture clean-up issues are well recognized in the literature. Although other systems such as viscoelastic surfactants, gelled oil, slick water, etc. are used, the majority of fluids used to create the fracture and carry the proppants are polymer-based. In most reservoirs with lower permeability, the polymer concentrates as carrier fluid leaks off during the fracturing process. The concentrated polymer hinders fluid flow in the fracture and often results in underperforming fractures. Typical remedies include use of breakers, including encapsulated breakers that allow a significant increase of the breaker loading. The breaker is added to the fluid/slurry and is intended to reduce the viscosity of the polymer-based carrier fluid and facilitate fracture clean-up. Despite high breaker loading, the retained permeability of the proppant pack is still only a fraction of the initial permeability and this has been the accepted situation in the industry.

U.S. Pat. Nos. 4,848,467 and 4,961,466 discuss the use of hydroxyacetic acid and similar condensation products which naturally degrade at reservoir temperature to release acid that may be a breaker for some polymers under some conditions and which offer fluid loss control. U.S. Pat. No. 3,960,736 (Oree) discusses the use of esters to provide a delayed acid, which will break the fluid by attacking both the polymer and the borate crosslinks. Similarly, acid generation mechanisms are employed in U.S. Pat. Nos. 4,387,769 and 4,526,695 (Erbstoesser), which suggest using an ester polymer. U.S. Pat. No. 3,868,998 (Lybarger) also mentions acid generation. These references rely on acid, which generally has a relatively low activity as the breaker, but oxidative breakers are much more effective and have become the industry standard for removing polymer damage. In addition, while low pH may break borate crosslinks, it is less effective for breaking the commonly used zirconium and titanium crosslinked gels. In fact, some gel systems employing zirconium or titanium are designed to be effective viscosifiers at low pH.

As used herein, the term "breaker" refers to a chemical moiety or suite of moieties whose primary function is to "break" or reduce the viscosity of the proppant-carrying fluid. Typically in the prior art, though not always, this occurs by oxidation.

In addition, "breaker aids" are often used in conjunction with breakers to promote breaker activity. Breaker aids are disclosed in, e.g., U.S. Pat. No. 4,969,526, Non-Interfering Breaker System for Delayed Crosslinked Fracturing Fluids at Low Temperature, assigned to Schlumberger (disclosing and claiming triethanolamine); and, U.S. Pat. No. 4,250,044. Similarly, "retarding agents" (or materials designed to inhibit cross-linking) are operable in conjunction with the present invention. See, e.g., U.S. Pat. No. 4,702,848, Control of Crosslinking Reaction Rate Using Organozirconate Chelate Crosslinking Agent and Aldehyde Retarding Agent, assigned to Schlumberger (disclosing and claiming aldehydes). Copper ion, silver ion, or the like are also known to function as catalysts in conjunction with a chemical breaker, dissolved oxygen, or other oxidant source, accelerating the breaker activity. In addition, different proppant-carrying matrices can be used with different breaker types—e.g., injecting in a first stage a less viscous and/or less dense fluid followed by fluids of lesser mobility. See, e.g., U.S. Pat. No. 5,036,919, Fracturing with Multiple Fluids to Improve Fracture Conductivity, assigned to Schlumberger. U.S. Pat. No. 5,036,919 discloses, for instance, pumping a zirconate cross-linked fluid followed by a borate cross-linked fluid. Hence, it is known to use different fluids in different stages of the treatment.

SPE 68854 and SPE 91434 disclose that fibers included in the slurry of proppant in carrier fluid may serve to aid in the transport of proppant at lower viscosities and/or lower slurry flow rates, provided that fibers of the appropriate length, diameter, and stiffness are chosen and used in the right concentration.

For years fibers have been used for different purposes in oilfield treatment operations. Most recently, fiber assisted transport technology has been used to improve particle transport in fracturing and wellbore cleanout operations while reducing the amount of other fluid viscosifiers required. Recent efforts to improve this technique have looked at better ways to more completely remove fiber that can be left in the wellbore or fracture.

In commonly assigned U.S. patent application Ser. No. 11/156,966, filed Jun. 20, 2005, and Ser. No. 11/059,123, priority date Jul. 2, 2004, polyester materials such as fibers and particles are disclosed for fiber assisted transport of proppant in a fracturing method, and for fluid loss control, respectively. The polyesters can be selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, and copolymers of lactic acid with other hydroxy-, carboxylic acid-, or hydroxycarboxylic acid-containing moieties, and mixtures of those materials. The polyester materials are naturally degraded typically 4 hours to 100 days after treatment to facilitate the restoration of permeability.

Other references that may be pertinent to the present invention include US2004/0216876; US2005/0034865; and U.S. Pat. No. 6,394,185.

Each of the references mentioned herein are hereby incorporated herein by reference in their entirety for the purpose of US patent practice and other jurisdictions where permitted.

There is a need for improved methods of placing a fluid loss control agent and removing the fluid loss control agent to restore permeability to the producing formation, especially where removal of the fluid loss control agent does not require a pH change or rely on a chemical reaction to initiate removal. Similarly, there is a need for improved methods of breaking viscosified well treatment fluids, especially employing a breaker or breaker aid that does not require changing pH or chemical reaction to activate the breaker and/or breaker aid. There is also a need for improved methods employing a fluid loss control agent or breaker that can be placed downhole in insoluble form and solubilized by salinity changes and/or by exposing the fluid loss agent or breaker to a temperature above a dissolution trigger temperature. Furthermore, there is a need for improved methods wherein a well treatment fluid additive can be used in insoluble form as a fluid loss control agent, fiber assisted proppant transfer fiber, or the like, and can then be solubilized by changing salinity conditions or exceeding a trigger temperature for removal to restore permeability, for breaking a viscosified well treatment fluid, or the like.

SUMMARY OF THE INVENTION

This invention overcomes many of the limitations of previous fluid systems.

In the present invention, a dissolvable polymer is used in a well treatment fluid in a solid form under conditions where the polymer is not dissolved, and after the polymer has fulfilled its solid-form function, it is subsequently dissolved by altering conditions such as temperature or salinity to activate the polymer to fulfill a soluble-state function and/or to remove the polymer. A polyol such as polyvinyl alcohol (PVOH) is one example of a polymer having such utility. PVOH is a water-soluble synthetic polymer, which is available in many forms such as powder, granules, beads and fibers. The solubility of amorphous or partially crystalline PVOH in aqueous solution is a function of temperature and salinity. Controlling these parameters enables the use of PVOH as a fluid loss control agent and as a temporary formation seal, for example. PVOH at some concentrations forms a thick, highly viscous paste at high salinity, while at low salinity it dissolves completely. Thus, putting the fluid in place at high salinity provides the amorphous consistency of PVOH to temporarily seal and control fluid losses. The cleanup mechanism of the formation seal is based on the solubilization of PVOH in a low salinity environment, e.g. fresh water, 2% KCl, or the like.

The present invention also discloses a non-damaging drilling fluid composition that is based on surfactants and a polyol fluid loss control agent, which provides ease and flexibility for subsequent completion processes.

As another example, PVOH is also available as a new fiber material recently developed for the clothing industry. The PVOH fibers are used in fiber assisted transport technology in hydraulic fracturing to place proppant in the fracture, and the PVOH fibers are readily removed from the proppant pack since they become soluble in low salinity aqueous fluids at typical formation temperatures. This technology is also applied in gravel packing to create tighter, cleaner packs.

As used herein, the term "particles" is used to refer to the PVOH or other polyols in its various insoluble physical forms, whether crystalline or amorphous, including powder, granules, beads, paste, fibers, or the like.

Broadly, in one embodiment, the invention provides a well treatment method that includes:
(1) injecting into a well a treatment fluid comprising insoluble polyol particles dispersed therein;
(2) maintaining insoluble conditions for the polyol particles during downhole placement; and
(3) a step selected from heating, desalinating and combinations thereof, for thereafter substantially dissolving the polyol particles.

The polyol is solubilizable upon heating, desalination (note that desalination does not necessarily mean a complete removal of salt but just a sufficient decrease in the salinity) or a combination thereof, and consists essentially of hydroxyl-substituted carbon atoms, in a polymer chain, spaced from adjacent hydroxyl-substituted carbon atoms by at least one atom in the polymer chain, usually a carbon atom. In an embodiment, the polyol comprises a polymer having repeating units according to the following formulae:

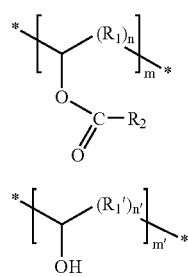

wherein $R_1$ and $R_1'$ can be the same or different, saturated or unsaturated, linear or branched alkyl chains having from 1 to 5 carbon atoms, and n and n' can be the same or different integers from 1 to 5, and $R_2$ is hydrogen or saturated or unsaturated, aliphatic or aromatic, linear or branched alkyl chain having from 1 to 12 carbon atoms. As used herein, the term "desalination" is used to refer to any reduction in salt concentration in the local environment of the polyol effective to solubilize the polyol, usually by diluting or flushing the more or less immobilized polyol with less saline water, even where the total salt content in the system may not actually be decreased.

In another embodiment, the polyol is a polyvinyl alcohol prepared by at least partial hydrolysis of a precursor vinyl polymer with ester substituents. When the polyol comprises polyvinyl alcohol (PVOH) prepared by at least partial hydrolysis of polyvinyl acetate, the well treatment fluid is injected at conditions, e.g., a temperature and salinity, at which the PVOH is not substantially dissolved. In one embodiment, the polyol has a weight average molecular weight greater than 5000. The polyol may if desired be hydrophobically modified.

The well treatment fluid may be a fluid loss control pill, a water control treatment fluid, a scale inhibition treatment fluid, a fracturing fluid, a gravel packing fluid, a drilling fluid, and a drill-in fluid, or the like. In one embodiment, the treatment fluid has a salinity effective to inhibit dissolution of the polyol at the formation temperature, and the polyol is desalinated in the dissolution step. For some polyols, the salinity of the treatment fluid is at least about 2 weight percent to inhibit dissolution, and at least about 5, 6 or 10 weight percent for other polyols. For some polyols, the desalination step reduces the salinity to less than about 5 weight percent to dissolve the polyol, and to less than 2 weight percent in another embodiment.

If desired, the downhole placement of the polyol particles is on a permeable formation surface to inhibit fluid loss to the formation. The polyol dissolution step may be used to at least partially restore permeability to the formation surface.

In another embodiment, the polyol dissolution is into a viscosified fluid in an amount effective to break a viscosifier in the viscosified fluid. The viscosified fluid can be the well treatment fluid in which the polyol is injected, or can be another fluid injected, mixed or otherwise placed adjacent the polyol before or after the downhole polyol placement. The viscosifier may be a crosslinked polymer such as for example a polysaccharide, and the crosslinker may be borate, zirconate, titanate, aluminate or the like, or a combination thereof. In another embodiment, the viscosifier comprises a viscoelastic surfactant system, e.g. betaines, amidoamine oxides, or the like.

In another embodiment of the well treatment method, the polyol particles are at least partially crystalline fibers soluble in fresh water above a trigger temperature. The fibers may have a length of from about 2 to about 25 mm, and/or a denier of from about 0.1 to about 20. In one embodiment, the treatment fluid during the injection has a temperature below the trigger temperature and the downhole placement is in a formation that is at a temperature above the trigger temperature. The treatment fluid may have a salinity effective to inhibit dissolution of the polyol at the formation temperature, and the dissolution step can include desalination.

In one embodiment employing the polyol fibers, the treatment fluid is a slurry of the fibers and proppant in a viscous carrier fluid. The method may include fiber assisted proppant transport. The carrier fluid may include a viscosifier and in one embodiment the dissolved polyol is a breaker for the viscosifier. The carrier fluid may be saline in an amount effective to inhibit solubility of the polyol above the trigger temperature, and the method may include maintaining salinity conditions to delay dissolution of the polyol during fracture closure.

In another embodiment, the polyol in the injection may be amorphous finely divided particles, the insoluble conditions may include salinity, e.g. at least about 2, 5, 6, or 10 weight percent in various embodiments, and the dissolution step may include desalination, e.g. to less than about 5 or less than about 2 weight percent in different embodiments. The amorphous polyol may be present in the injected well treatment fluid as a superviscous phase.

In one embodiment, the injection may include injecting the treatment fluid containing the amorphous polyol particles into a formation adjacent the well at a pressure sufficient to create a fracture in the formation, said fracture having opposing faces, and forming a filter cake comprising the polyol particles on a face of the fracture. The treatment fluid injection may be followed by injection of a proppant-containing fluid having reduced salinity, or followed by injection of a high-salinity, proppant-containing fluid and thereafter by a proppant-free fluid having reduced salinity. Alternatively, the injected treatment fluid includes proppant, and the proppant-containing fluid injection is followed by injection of a proppant-free fluid having reduced salinity. In another embodiment, desalination is effected or aided by initiating fluid flow from the formation through a proppant pack in the fracture. Desirably, the fracture has opposing faces, a viscosifier is concentrated adjacent the filter cake, and a thickness of the filter cake and concentrated viscosifier on each fracture face is less than one half a fracture width.

In another embodiment of the method employing the amorphous polyol particles in drilling, the well treatment method includes:

(1) circulating the treatment fluid in the well while drilling;
(2) forming a filter cake comprising the polyol particles on a downhole surface in the well;
(3) contacting the filter cake in a production zone with a low-salinity fluid to restore permeability; and
(4) producing fluid from a formation in the production zone.

In this method, the well treatment fluid may be a drilling fluid, for example, an otherwise clear drilling fluid substantially free of particles (other than the polyol particles) that may employ a viscoelastic surfactant system to viscosify the fluid.

In another aspect, the invention provides a composition of matter in the form of a well treatment fluid. The fluid may include an aqueous base fluid, a viscosifier system for the base fluid, and either (1) a fluid loss control agent comprising finely divided particles of amorphous polyol dispersed in the base fluid, wherein the polyol is soluble in fresh water and insoluble in saline, and salinity to inhibit dissolution of the polyol particles, and/or (2) at least partially crystalline polyol fibers soluble in fresh water above a trigger temperature, and having a length of about 2 to about 25 mm and a denier of about 0.1 to about 20.

The viscosifier in the composition may be a crosslinked polymer such as for example a polysaccharide, and the crosslinker may be borate, zirconate, titanate, aluminate or the like, or a combination thereof. In another embodiment, the viscosifier in the composition comprises a viscoelastic surfactant system, e.g. betaines, amidoamine oxides, or the like.

Whether crystalline or amorphous, the polyol in the composition may consist essentially of hydroxyl-substituted carbon atoms in a polymer chain spaced from adjacent hydroxyl-substituted carbon atoms by at least one atom in the polymer chain, e.g. at least one carbon atom. In an embodiment, the polyol comprises a polymer having repeating units according to the following formulae:

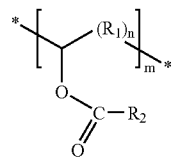

1

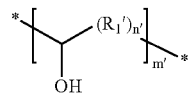

2 wherein $R_1$ and $R_1'$ can be the same or different, saturated or unsaturated, linear or branched alkyl chains having from 1 to 5 carbon atoms, and n and n' can be the same or different integers from 1 to 5, and $R_2$ is hydrogen or saturated or unsaturated, aliphatic or aromatic, linear or branched alkyl chain having from 1 to 12 carbon atoms.

In another embodiment, the polyol is a polyvinyl alcohol prepared by at least partial hydrolysis of a precursor vinyl polymer with ester substituents. When the polyol comprises polyvinyl alcohol (PVOH) prepared by at least partial hydrolysis of polyvinyl acetate, the well treatment fluid is injected at conditions, e.g., a temperature and salinity, at which the PVOH is not substantially dissolved. In one embodiment, the polyol has a weight average molecular weight greater than 5000. The polyol may if desired be hydrophobically modified.

The treatment fluid of the composition may be a fluid loss control pill, a water control treatment fluid, a scale inhibition treatment fluid, a fracturing fluid, a gravel packing fluid, a drilling fluid, and a drill-in fluid, or the like. The composition may have a salinity effective to inhibit dissolution of the polyol at ambient temperature, e.g. at least about 2, at least about 5, at least about 6, and at least about 10 weight percent salinity. The composition may further have proppant slurried therein. The polyol may also be capable of breaking the viscosifier system upon dissolution, but be stabilized from breaking the viscosifier system by the initial insolubility of the polyol.

In one embodiment of the composition including the polyol fiber, the polyol is insoluble in saline and the well treatment fluid has a salinity effective to inhibit dissolution of the polyol at the trigger temperature, e.g. at the salinity levels mentioned above. In another embodiment of the composition including the polyol fiber, the viscosity of the carrier in the absence of fibers is insufficient to prevent proppant settling during transport, and wherein the fibers in the carrier inhibit or prevent settling of the proppant during transport.

In a further aspect, the present invention provides at least partially crystalline PVOH fibers in contact with an aqueous medium wherein the fibers are stabilized by the salinity of the aqueous medium against dissolution.

DETAILED DESCRIPTION OF EMBODIMENTS OF THE INVENTION

Polyols

Figure 1:
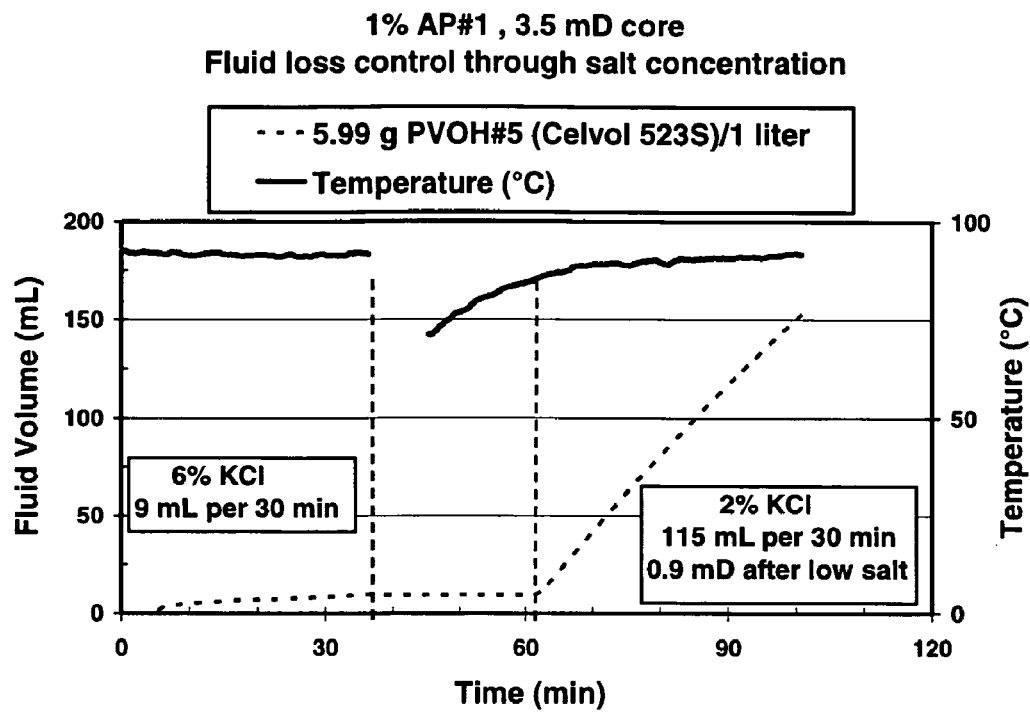
FIG. 1 is a fluid loss plot showing fluid loss control through salt concentration using polyvinyl alcohol (PVOH) with a 3.5 mD core according to one embodiment of the invention.

A polyol is a polyhydric alcohol, i.e., one containing three or more hydroxyl groups. One embodiment of polyols useful in the present invention is a polymeric polyol solubilizable upon heating, desalination or a combination thereof, and which consists essentially of hydroxyl-substituted carbon atoms, in a polymer chain, spaced from adjacent hydroxyl-substituted carbon atoms by at least one carbon atom in the polymer chain. In other words, the useful polyols are preferably essentially free of adjacent hydroxyl substituents. In one embodiment, the polyol has a weight average molecular weight greater than 5000 up to 500,000 or more, and from 10,000 to 200,000 in another embodiment. The polyol may if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyol may also be modified to include carboxylic acid, thiol, paraffin, silane, sulfuric acid, acetoacetylate, polyethylene oxide, or quaternary amine or other cationic monomers. Such modifications have several affects on the properties of the polyol; affects on solubility, sensitivity to salinity, pH, and crosslinking functionalities (e.g. hydroxyl groups and silanol groups which are chelates that can crosslink with common crosslinkers) are of most interest to the present invention. All of said modifications are commercially available products.

In one embodiment, the polyol is a substituted or unsubstituted polyvinyl alcohol that can be prepared by at least partial hydrolysis of a precursor polyvinyl compound having ester substituents, such as, for example, polyvinyl acetate, polyvinyl propanoate, polyvinyl butanoate, polyvinyl pentanoate, polyvinyl hexanoate, polyvinyl 2-methyl butanoate, polyvinyl 3-ethylpentanoate, polyvinyl 3-ethylhexanoate, and the like, and combinations thereof. When the polyol comprises polyvinyl alcohol prepared by at least partial hydrolysis of polyvinyl acetate (PVOH), the polyol is not generally soluble in salt water, as discussed in more detail below, and further, the polyol is commercially available in the form of partially crystalline fibers that have a relatively sharp trigger temperature below which the fibers are not soluble in water and above which they readily dissolve, also as discussed in more detail below.

Suitable repeating units in the polyols may have the following formulae:

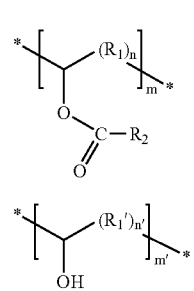

Polymers may contain units 1 and 2 in varying proportions, where $R_1$ and $R_1'$ can be the same or different but are usually the same. In the structures, $R_1$ or $R_1'$ is an alkyl chain that can be saturated or unsaturated, linear or branched, containing 1 to 5 carbon atoms, where n and n'=1 to 5, and where n and n' can be equal or different, but preferably equal. $R_2$ is an alkyl chain that can be saturated or unsaturated, aliphatic or aromatic, linear or branched, from 0 carbons (i.e. hydrogen) to 12 carbons. In the formulae above, m=0 to 5,000 and m'=100 to 10,000. The units 1 and 2 can be alternating, random or block in configuration.

From the above general description, polymers can be defined by changing parameters. For example, polyvinyl alcohol 99.99% hydrolysis with MW of ~5000 would be: m=0, R1'=$CH_2$, n'=1, m'=100. Polyvinyl alcohol with 90% hydrolysis and MW of ~5000 and derived from polyvinyl acetate would be: m=~10, n=n'=1, R1=R1'=$CH_2$, R2=$CH_3$, m'=~90.

Polyol Example—PVOH

For the purpose of illustration only, the invention is described hereafter with reference to polyvinyl alcohol (PVOH) as one example of a suitable polyol. Those skilled in the art will appreciate that the present invention is not limited to PVOH and is equally applicable to polyols that meet the above-stated requirement of having alterable solubility modes in the context of well treatment fluids and methodology.

A particular advantage of PVOH is that it is non-toxic and is biodegradable. For example, PVOH is commonly found in the medical industry and fiber forms are commonly used in clothing or fabrics that are intended to dissolve when washed in warm or hot water.

PVOH is a solid material that is manufactured in many forms, such as, for example, fibers, sheets, granules, beads, powder, and the like. PVOH is a synthetic polymer that is water soluble and generally unaffected by petroleum hydrocarbons. The polymer comprises a carbon chain backbone with hydroxyl and acetate groups. According to Kirk et al., *Encyclopedia of Chemical Technology*, 3rd *Edition, Vol.* 23, John Wiley and Sons, pp. 848-865 (1983), PVOH may be produced by the hydrolysis of polyvinyl acetate in methanol catalyzed by a base according to the following equation:

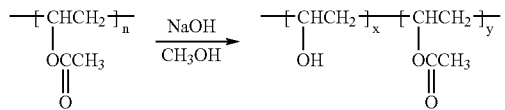

PVOH can generally exist in three different aggregation states, which are controlled by solution conditions. In its solid state, PVOH is semi-crystalline. The degree of crystallinity varies from one mode of manufacture to another and with the degree of hydrolysis and grade of the PVOH. In aqueous solution, PVOH can lose crystallinity and swell to form an amorphous structure, which is flexible and malleable, but not yet solubilized. Depending on solution conditions, PVOH can solubilize completely and exist as polymer stands in solution.

The present invention may use PVOH in an insoluble form to create a filter cake or otherwise place the PVOH downhole in a wellbore or formation. By changing the salinity and/or temperature conditions adjacent the PVOH deposits, the PVOH may be solubilized to remove the PVOH deposits and/or to activate the PVOH for use as a breaker or other downhole function. Any PVOH filter cake may thus be destroyed as desired. PVOH fibers used in fiber assisted transport, for example, are removed to improve permeability. Solubilized PVOH may be used as a delayed breaker for crosslinked polymer or viscoelastic surfactant (VES fluid systems), for example.

The invention takes advantage of the observation that the solubility of PVOH and similar polyols in aqueous media may be controlled by the salt content. In a brine of sufficiently high salt concentration, PVOH is insoluble but will become a sticky, flexible material that readily bonds to itself and to solid surfaces. By dropping the brine concentration below a critical salt level, however, the sticky PVOH solids may become soluble and rapidly dissolve into solution.

Dissolution of PVOH is controlled by the degree of hydrolysis, molecular weight, crystallinity, particle size, and the like of the PVOH. The degree of hydrolysis is defined as the mole percent of hydroxyl groups on the polymer chain in relation to the non-hydrolyzed acetate groups. For example, PVOH with a degree of hydrolysis of 88 would have 88 mole percent hydroxyl groups and 12 mole percent acetate groups along the polymer backbone. The hydroxyl and/or acetate groups may be distributed randomly or in blocks.

Most PVOH grades dissolve at around 80° C. (176° F.). A degree of hydrolysis of about 88% is optimum for solubility, i.e. the solubility of the PVOH decreases when the degree of hydrolysis is more or less than about 88%. As the degree of hydrolysis increases above 88%, solubility decreases due to a tighter alignment of the hydroxyl moieties which is thought to result from a form of hydrogen bonding. Below 88% hydrolysis, solubility decreases due to the increased number of acetate groups; polyvinyl acetate is generally insoluble in water. Other factors affecting PVOH solubility may include polymer concentration and salt concentration; the amount of unsolubilized PVOH, e.g. amorphous PVOH, may increase with increased concentrations of salt or polymer. The crystallinity of the PVOH may also be used to control the temperature at which the PVOH will dissolve. For example, PVOH's that are partially crystalline to varying extents may be soluble in water at temperatures ranging from 20° C. to 90° C. As part of the dissolution process PVOH goes through a "glue like" or amorphous state. The solubility and the glue state of PVOH polymer may also be controlled through salt concentration. For example, a PVOH fiber that completely dissolves in 2 wt % KCl brine at 80° C. (176° F.), may not completely dissolve below 93° C. (200° F.) in 6% KCl brine, may only deform and clump at 93° C. (200° F.) in 10% KCl brine, and may not be affected at all at 93° C. (200° F.) in 12% KCl brine.

The conditions and rate of dissolution of PVOH, having a particular chemical and physical make-up, including crystallinity, degree of hydrolysis, molecular weight and distribution, a coating if present, at a particular temperature and in contact with a fluid or fluids of a particular salinity, is readily determined by a simple experiment: exposing the PVOH to the fluid or fluids under treatment conditions and monitoring the solubilization.

The PVOH may be manufactured and used in various solid shapes, including, but not limited to fibers, powders, granules, and the like. The system comprising a well treatment fluid and PVOH (and any other additives) may be batch-mixed or mixed on-the-fly using otherwise conventional treatment fluid mixing equipment and mixing techniques.

If the PVOH is in crystalline fiber form that is used primarily below its trigger temperature for placement and does not swell or become amorphous until just before downhole solubilization, then most commonly, straight fibers are used; however, curved, crimped, spiral-shaped and other three dimensional fiber geometries are useful. Also, the fibers may be bundled together, or hooked on one or both ends. In one embodiment, the fiber length is at least about 2 millimeters, and the fiber diameter ranges from about 3 to about 200 microns. There appears to be no upper limit on the length of the fibers employed from the standpoint of utility. Handling, mixing, and pumping equipment dictate the practical upper limit for the length of fibers. Suitable PVOH fibers in one embodiment have a length of about 2-25 mm, preferably about 3-18 mm, most preferably about 6 mm; they have a denier of about 0.1-20, preferably about 0.15-6 Such fibers are optimized for particle transport.

If the PVOH is amorphous or changes from crystalline to amorphous form in the well treatment fluid, the particular physical form is less critical since the PVOH will form a gluelike phase that will disperse as small particles in the treatment fluid. If the PVOH is to be used as a fluid loss additive, the particle size of the PVOH particles is chosen based primarily on the desired fluid loss properties (e.g. spurt and wall building coefficient). Typical particle sizes for beads or powders range from submicron, for example about 0.2 microns, to about 200 microns, for example from about 10 to about 50 microns, but the actual size depends especially upon the formation properties and on other factors known to those of ordinary skill in the art. Amorphous or partially crystalline PVOH fibers in these size ranges are also suitable.

If the PVOH is to be used as a breaker, the particles may be of a broader size range, for example from nanoparticles (for breaking a VES within a matrix) to the size of proppants for breaking carrier fluid. The PVOH and its properties, such as molecular weight and crystallinity, are chosen based primarily on the desired rates of dissolution in the carrier fluid to be used at the temperature and salinity at which it will be used. These choices may also be influenced by the desired time before the delayed break, which could depend upon the size of the job, whether the job is hydraulic fracturing or gravel packing, and other factors known to those of ordinary skill in the art, including the concentrations and natures of the VES or crosslinked polymer and any other additives, and the temperature.

Moreover, there may be changes to the parameters during a treatment which are taken into account in the choice of a particular PVOH solid, including its chemistry and crystallinity, its size and shape, and its concentration, among other factors, depending upon the way it will be used. All of these parameters may be affected by the nature of the job, for example, whether or not fluid loss control is needed, the temperature, the nature of the formation, and the time desired before a break occurs and/or the time desired by which a break has occurred. For example, fluid loss control may not be needed when gravel packing in a low permeability formation and the choices may be made on the basis of breaking properties. Suitable choices may be made with the aid of simple experiments like those described above, or in the examples below, optionally with the aid of simulation software.

When PVOH fibers, for example, are employed they may have a temperature-triggered solubility in water, for example, above 90° C. The trigger temperature should be above the injection temperature, but below the formation temperature. In this manner the PVOH fibers are injected with the treatment fluid as a solid, but become solubilized downhole as the temperature increases above the trigger temperature. Solubilization may be delayed by employing PVOH fibers with a trigger temperature just below the formation temperature and/or continued injection of low temperature fluids to maintain the fibers below the trigger temperature until dissolution is desired. Where the solubility of the fibers is controlled by maintaining a sub-trigger temperature, aqueous fluids with low salinity may be employed. Also, the solubilization of the fibers may be controlled or delayed further by using high-salinity fluid so that if the trigger temperature is exceeded, solubilization does not occur until the salinity is reduced. Care should be taken to avoid impairing fluid flow at a condition where the fibers are not entirely soluble but have become "sticky" so as to clump and block interstitial spaces.

Fibers are well known to be used for various purposes in oilfield treatment operations. Fiber assisted transport technology has been used to improve particle transport in fracturing and wellbore cleanout operations while reducing the amount of other fluid viscosifiers required. The present invention employs at least partially crystalline PVOH fibers to extend this technique broadly since the fibers may be made to dissolve after the treatment so that no permanent fiber residue is left in the wellbore or fracture. This invention may also improve gravel packing to create tighter, cleaner packs. PVOH fibers having temperature triggers at pre-selected temperatures are available commercially under the trade designation KURALON K-II (Kuraray America, Incorporated), for example. The PVOH fiber has significant advantages over the polyester and other fiber materials currently in use. These PVOH fibers completely dissolve in water when brought to a defined trigger temperature, but are virtually insoluble at lower temperature for a broad range of pH and chemical conditions. These PVOH fibers are made to have defined temperature trigger points for aqueous dissolution at desired temperatures between 20° C. and 90° C., in 10° C. increments. When the PVOH fiber does dissolve into an aqueous treatment or reservoir fluid, it releases polyvinyl alcohol in solution. This may effectively break VES fluids. The dissolved fiber may also break some crosslinked guar based or other polymer-viscosified fluids since the addition of dissolved polyvinyl alcohol effectively acts to take borate, titanate, zirconate and similar ions away from the guar based molecules, thereby reducing the viscosity of the crosslinked polymer to that of the linear gel.

Fibers and other particle forms are also available in non-crystalline or semicrystalline/amorphous form. When an amorphous PVOH is employed, dissolution of the PVOH may be controlled by salinity alone. The well treatment fluid in which the PVOH particles are introduced should have a high salinity to avoid premature dissolution. When it is desired to dissolve the PVOH solids, salinity conditions are reduced by introducing a subsequent treatment fluid of low salinity, e.g. fresh water or 2% KCl, or where the formation water has a low salinity, allowing the connate water to flow to the environment of the PVOH solids.

The PVOH solids may optionally be coated to slow the dissolution. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the PVOH solids by any means delays the dissolution. Note that coating here may refer to encapsulation or simply to changing the surface by chemical reaction or by forming or adding a thin film of another material. Another suitable method of delaying the dissolution of the PVOH solids is to suspend the solid, optionally with a hydrophobic coating, in an oil or in the oil phase of an emulsion. The dissolution does not occur until low salinity water contacts the solid PVOH above any solubility trigger temperature.

Crosslinked Polymers

PVOH may be used for fluid loss control and/or as a breaker in well treatment fluids that include polymer viscosifiers, especially metal-crosslinked polymers. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of water-soluble polymers effective as viscosifiers (provided that specific examples chosen are compatible with the insoluble PVOH or other polyol) include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently, unless they can be used at lower concentrations.

Linear (not cross-linked) polymer systems may be used, but generally will not achieve the full benefits of the invention because they may require more polymer and may require a breaker in addition to any breaking effect of the PVOH. All crosslinked polymer systems may be used, including for example delayed, optimized for high temperature, optimized for use with sea water, buffered at various pH's, and optimized for low temperature. Any crosslinker may be used, for example boron, titanium, zirconium, aluminum and the like. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives may be used or included provided that they are tested for compatibility with the PVOH fibers or particles (the PVOH or the chemicals in the fluids must not interfere with the efficacy of one another or with fluids that might be encountered during the job, like connate water or flushes). For example, some of the standard crosslinkers or polymers as concentrates usually contain materials such as isopropanol, n-propanol, methanol or diesel oil.

Viscoelastic Surfactants

A viscoelastic surfactant (VES) fluid system is a fluid viscosified with a viscoelastic surfactant and any additional materials, such as but not limited to salts, co-surfactants, rheology enhancers, stabilizers and shear recovery enhancers that improve or modify the performance of the viscoelastic surfactant. PVOH can be used for fluid loss control and/or as a breaker for VES systems. When fluid loss control is not needed, the PVOH may still be used as a delayed breaker, preferably in smaller particle sizes, that breaks the fluid wherever it is, even inside a formation matrix, or PVOH fibers may be used.

The useful VES's include cationic, anionic, nonionic, mixed, zwitterionic and amphoteric surfactants, especially betaine zwitterionic viscoelastic surfactant fluid systems or amidoamine oxide viscoelastic surfactant fluid systems. Examples of suitable VES systems include those described in U.S. Pat. Nos. 5,551,516; 5,964,295; 5,979,555; 5,979,557; 6,140,277; 6,258,859 and 6,509,301, all hereby incorporated by reference. The PVOH in this invention is also useful when used with several types of zwitterionic surfactants. In general, suitable zwitterionic surfactants have the formula:

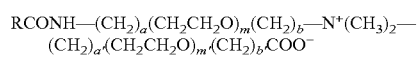

in which R is an alkyl group that contains from about 14 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and the O in either or both $CH_2CH_2O$ groups or chains, if present, may be located on the end towards or away from the quaternary nitrogen. Preferred surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, is used in the experiments described below; it contains an erucylamidopropyl group (including a $C_{21}H_{41}$ alkene tail group) and is about 40% active ingredient, with the remainder being substantially water, sodium chloride, and isopropanol. (Before use, about 1% of DAXAD 17, a low molecular weight sodium polynaphthalene sulfonate available from Hampshire Chemical Corporation, Nashua, N.H., USA, is added to the as-received betaine surfactant BET-E-40.) This VES fluid system may be made with 6% of the BET-E-40 surfactant. BET surfactants, and others that are suitable, are described in U.S. Pat. No. 6,258,859.

Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

The use of PVOH fibers or amorphous solids in a well treatment method while maintaining the stability of a VES system, and then dissolving the PVOH to break the VES, may be used with any VES system without regard to pH stability, i.e. at high or low pH, provided that the VES fluid system is compatible with the formation, the formation fluids, and any other fluids with which it may come in contact, for example a pad fluid, and its components and additives.

Although the invention has been described using the term "VES", or "viscoelastic surfactant" to describe the non-polymeric viscosified well treatment fluids, other non-polymeric materials may also be used to viscosify the fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. Nos. 6,035,936 and 6,509,301.

VES fluid systems are used most commonly in treatments in which filter cakes are desired during the treatment but are deleterious after the treatment, especially in hydraulic fracturing and gravel packing. VES fluid systems may also be used where it is simply desirable to break viscous fluids, whether or not a filter cake is formed; in some cases the fluid may invade the formation. Such viscous fluids may be, by non-limiting example, hydraulic fracturing and gravel packing fluids in the packs or in formations, drilling fluids, wellbore cleanout fluids, fluid loss control fluids, kill fluids, spacers, flushes, pushers, and carriers for materials such as scale, paraffin, and asphaltene inhibitors.

The VES may self-destruct in situ, that is, in the location where it is placed. That location may be part of a suspension in a treatment fluid in the wellbore, in perforations, in a gravel pack, or in a fracture; or as a component of a filter cake on the walls of a wellbore or of a fracture; or in the pores of a formation itself. The VES fluid system may be used in formations of any lithology but is used most commonly in carbonates or sandstones.

As with metal cross-linked polymer systems, any viscoelastic surfactant (VES) fluid systems may also be used provided that they are tested for compatibility with the PVOH fibers. Non-limiting suitable examples include those described in U.S. Pat. Nos. 5,551,516; 5,964,295; 5,979,555; 5,979,557; 6,140,277; 6,258,859 and 6,509,301, all hereby incorporated by reference.

pH Control

We have found that insoluble (at treatment temperature and/or salinity) PVOH, examples being crystalline fibers and amorphous particles, may be used as an additive, e.g. as a fluid loss additive or for another purpose, that produces a breaker for a crosslinked polymer or viscoelastic surfactant based fluid system. Since the PVOH does not affect the pH and is kept from prematurely breaking by maintaining salinity and/or temperature conditions, a pH control agent will not be necessary to ensure proper function of the PVOH, although one may be necessary and can be used if desired, for example, to ensure that the crosslinked polymer or VES fluid system maintains viscosity before the break.

VES fluid micelles are usually broken by the natural inflow of hydrocarbons and water or brine, but breakers such as certain salts or alcohols are sometimes also used. Some viscoelastic surfactants are known to form micelle/vesicle structures that can be damaged or destroyed by pH changes, or, in some cases, the surfactants themselves are damaged or destroyed. Some VES systems, for example some cationic systems, are not very sensitive to pH, and some VES systems, for example some anionic systems, are typically buffered to a pH of above 12 in normal use, and the PVOH solids of this invention may be beneficially employed in any such systems. However, since the dissolution of the PVOH to function as a breaker is not very sensitive to pH, i.e. it can be dissolved at typical VES fluid pH's by reducing salinity, it is possible to use a VES fluid at the desired pH with appropriate buffers if desired, such as, for example, acidic pH's in the range of 2-6, neutral pH's in the range of 6-8, or basic pH's in the range of 8 to 12. On the other hand, the PVOH can be used in conjunction with or in addition to other breakers such as acids or bases, and/or breaker aids such as activators, delay agents or stabilizers.

Suitable pH control agents, if employed in the well treatment fluid, include, but are not limited to, sodium, potassium and ammonium sesquicarbonates, oxalates, carbonates, hydroxides, bicarbonates, and organic carboxylates such as acetates and polyacetates. Examples are sodium sesquicarbonate, sodium carbonate, and sodium hydroxide. Soluble oxides, including slowly soluble oxides such as MgO, may also be used. Amines and oligomeric amines, such as alkyl amines, hydroxyalkyl amines, anilines, pyridines, pyrimidines, quinolines, and pyrrolidines for example triethanolamine and tetraethylenepentamine, may also be used. The choice of pH control agent depends in part upon the VES and/or polymer system used. For example, MgO generally precipitates anionic VES's but is suitable for cationic and zwitterionic VES's. Some salt-like inorganic-based pH control agents, such as carbonates, may deleteriously affect the rheology of some VES's that are sensitive to electrolyte concentration, so in those cases organic-based pH control agents such as amines would be the better choices.

Other Additives

When PVOH is used in fluids in such treatments as drilling, drill-in, completion, stimulation (for example, hydraulic fracturing or matrix dissolution), sand control (for example gravel packing, frac-packing, and consolidation), diversion, and others, the insoluble PVOH is generally inert to the other components of the fluids, so the other fluids may otherwise be prepared and used in the usual way, taking care to avoid conditions that would tend to prematurely solubilize the PVOH particles. Normally, such fluids would typically contain a fluid loss additive and filter cake former, so the PVOH replaces some or the entire fluid loss additive and filter cake former that would otherwise have been used. In many cases, if the fluid contains a component that would affect or be affected by the PVOH, either the amount or nature of the PVOH or the amount or nature of the interfering or interfered-with component may be adjusted to compensate for the interaction. This may readily be determined by simple laboratory experiments.

Any additives normally used in such treatments may be included, again provided that they are compatible with the other components and the desired results of the treatment. Such additives may include, but are not limited to anti-oxidants, crosslinkers, corrosion inhibitors, delay agents, biocides, buffers, fluid loss additives, etc. The wellbores treated may be vertical, deviated or horizontal. They may be completed with casing and perforations or open hole.

Fluid Loss Control

By using a well treatment fluid to provide a high salt environment, PVOH may be used in its glue-like state to control fluid loss, for example. Salt concentration in the fluid containing the PVOH may be 2 percent by weight or greater, preferably 5 percent by weight or greater, more preferably 6 percent by weight or greater, even more preferably 10 percent by weight or greater, and most preferably at least 12 percent by weight or greater. The choice of salt is not particularly critical and the salt may be any salt that inhibits PVOH solubilization and is otherwise suitable for use in a well treatment fluid. The PVOH may be used in the well treatment fluid at a concentration or loading of from 0.6 to 24 g/L (from 5 to 200 ppt), preferably from 1.2 to 18 g/L (from 10 to 150 ppt), and especially at from 2.4 to 9.6 g/L (from 20 to 80 ppt). Then, the salt concentration of the environment may be lowered to dissolve the PVOH and clean up the surface of the formation or the filter cake, at a salt concentration at which the PVOH is soluble, preferably a salt concentration of less than 5 weight percent, more preferably 2 percent by weight or less, or fresh water.

In the present invention, PVOH may be used as a fluid loss control agent in an otherwise conventional drilling fluid or fluid loss control pill, for example. As noted above, PVOH solubility in aqueous solution is a function of temperature and salinity, among other variables. Controlling these parameters enables the use of PVOH as a fluid loss control agent and/or as a temporary formation seal. At sufficient concentration PVOH forms a thick, highly viscous paste at high salinity; while at low salinity it may be dissolved completely. Thus, placing the fluid at high salinity provides fluid loss particles with the consistency of amorphous PVOH to seal the formation and control fluid losses temporarily by deposition on surfaces as a film. The film at the face of the formation forms an external filter cake and the paste, being able to intrude into the porous medium, forms an internal filter cake. The cake formation either way effectively controls fluid loss. The clean-up mechanism of the formation seal is based on the solubilization of PVOH in a low salinity environment, such as by exchanging the well treatment fluid with water, 2% KCl, or the like.

Although there is not universal agreement on the precise relationship of particle size, pore dimension, and bridging, the following guidelines are used herein. Particles having diameters greater than about one-third (although some researchers say up to one half) of a pore throat diameter are expected to bridge at or near the formation face. Particles smaller than that but larger than about one-seventh of a pore throat diameter are expected to enter the formation and be trapped and form an internal filter cake. Particles smaller than about one-seventh of a pore throat diameter are expected to pass through the formation without substantially affecting flow. It is to be understood that there are other important factors such as distributions of particle and pore sizes, flow rate, particle concentration, and particle shape.

When one function of the PVOH fluid system is to control leak off, the optimal concentrations of the PVOH in the particular fluid system are determined by choosing the desired leak-off parameters and measuring leak-off with samples of the intended fluids and of the formation or of a rock similar to the formation. Leak-off is defined by three terms: "spurt", which is the initial rapid leak-off of fluid before a filter cake barrier is formed on the fracture face and is measured in L/square meter (or gallons/100 square feet), and, for the subsequent leak-off that occurs even after a filter cake is formed and is governed by the viscosity and the wall-building propensity: Cw, the wall-building fluid loss coefficient, and Cv, the viscosity controlled fluid loss coefficient. Cw is not applicable where there is no wall-building material present. Cv is not applicable where there is a low, finite Cw. Cw and Cv are measured in mm/min$^{1/2}$ (ft/min$^{1/2}$). Preferred, more preferred and most preferred values of spurt, Cw and Cv are as follows:

| Embodiment | Spurt, L/m2 (gal/100 ft2) | Cw, mm/min$^{1/2}$ (ft/min$^{1/2}$) | Cv, mm/min$^{1/2}$ (ft/min$^{1/2}$) |
|---|---|---|---|
| Preferred | 0 to about 2 (0 to about 5) | about 0.3 to about 15 (about 0.001 to about 0.05) | about 0.3 to about 15 (about 0.001 to about 0.05) |
| More preferred | 0 to about 0.8 (0 to about 2) | about 0.3 to about 2.4 (about 0.001 to about 0.008) | about 0.3 to about 2.4 (about 0.001 to about 0.008) |
| Most preferred | 0 to about 0.4 (0 to about 1) | about 0.3 to about 0.9 (about 0.001 to about 0.003) | about 0.3 to about 0.9 (about 0.001 to about 0.003) |

The values of these parameters (and the actual behavior they represent) may vary significantly provided that a suitable filter cake is produced in an appropriate time. A test method for determining these values is given in Navarrete et al., "Dynamic Fluid Loss in Hydraulic Fracturing Under Realistic Shear Conditions in High-Permeability Rocks," SPE Production and Facilities, pp 138-143 (August, 1996).

Viscosity Breaker

The PVOH may be used as a delayed viscosity breaker in crosslinked polymer and VES systems. Upon dissolution, the PVOH fiber or particles can function as a viscosity breaker. The break can thus be timed to occur by delaying dissolution of the PVOH. Alcohol is a known breaker for VES, and we have found that dissolved PVOH will break VES systems.

The dissolved PVOH also breaks crosslinked guar based or other polymer-viscosified fluids since the addition of dissolved polyvinyl alcohol, it is believed, effectively acts to take borate, titanate, zirconate and similar ions away from the guar based molecules, thereby reducing the viscosity of the crosslinked polymer to that of the linear gel. Although not wishing to be bound by theory, it is believed the PVOH may strip the crosslinking ions from the polymer.

When a crosslinked polymer is used, there is a tendency for the polymer concentration to build up at the formation interface where the PVOH filter cake is deposited. This allows the PVOH to solubilize where the crosslinked polymer concentration is the greatest and thus where the PVOH is needed most to break the polymer.

Drilling Fluid

PVOH may also be employed for filter loss control and/or as a breaker in a non-damaging drilling fluid composition that may be based on surfactants, which provides ease and flexibility for subsequent completion processes. The composition overcomes limitations with some previous fluid systems. The use of surfactant-based VES fluids is well known for use in gravel pack treatments for sand control, and such fluids have been proposed for use as drilling fluids. The present invention retains non-damaging properties, sea water resistance and heavy brine tolerance, but at the same time, introduces better oil compatibility, and the PVOH fluid loss control agent may be removed later via simple salinity change, for example.

The drilling fluid may include a surfactant-based fluid system that is compatible with high-density brines, including monovalent, divalent and polyvalent brines, for use in drilling or reservoir drill-in systems, at any suitable density, e.g. a fluid density of up to 2.2 g/mL (18 ppg) or more. The surfactant-based fluid system exhibits high yield point for cuttings transport and low plastic viscosity for reducing drag. The drilling fluid has rheological properties similar to the VES systems commercially used for fracturing and gravel packing. The surfactant-based fluid systems of the invention provide acceptable tolerance to contaminants commonly found in drilling, such as, for example, cement, reactive shale, oil, and so forth.

In treatments of subterranean formations, in particular in hydraulic fracturing and gravel packing treatments, the total volume of fluid pumped to complete the treatment is strongly influenced by the quantity of fluid lost to the surrounding matrix. In conventional fluids having polymers or crosslinked polymers as the viscosifying agents, during the initial phase of the treatment, the polymers or crosslinked polymers are filtered at the rock face to form a polymer filter cake that subsequently inhibits further losses. However, VES-based fluids are polymer-free—which in itself is a major advantage since polymers, remaining in the matrix (or in the proppant pack or gravel pack) once the treatment is over, are a main source of damage—and consequently the fluid loss process is not governed by viscosifier filter-cake formation.

Fracturing

In fracturing, the pad and fracturing fluid are viscosified because increased viscosity results in formation of a wider fracture, thus a larger flowpath, and a minimal viscosity is required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity aqueous fluid with good to moderate leak-off properties, and typically no proppant, into the formation. This pad is usually followed by a carrier fluid of similar viscosity carrying an initially low concentration and then a gradually or incrementally step-wise increasing concentration of proppant into the extended fractures. The pad initiates and propagates the fracture but does not need to carry proppant. All the fluids tend to "leak-off" into the formation from the fracture being created. Commonly, by the end of the job the entire volume of the pad will have leaked off into the formation. This leak-off is determined and controlled by the properties of the fluid (and additives it may contain) and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the end of the fracture, stopping the lengthening of the fracture and resulting in a subsequent increase in the fracture width. On the other hand, excessive leak-off is undesirable because it may waste valuable fluid and result in reduced efficiency of the job. Proper leak-off control is therefore critical to job success.

In hydraulic fracturing, frac-packing, and gravel packing embodiments, the VES or crosslinked polymer may be added in the pad, throughout the treatment or to only some of the proppant or gravel stages. The PVOH may be a fiber in any of these uses and will retard flowback and settling of proppant or gravel, and/or of fines if they are present, until the PVOH dissolves. A self-destructing fluid loss additive and filter cake is particularly useful in hydraulic fracturing, frac-packing, and gravel packing because mechanical removal methods are impossible and methods involving contacting the fluid loss additive and filter cake with an additional fluid to react with the filter cake and/or fluid loss additive are not practical. For example, calcite is known to be an excellent fluid loss additive, but calcite is not soluble in water, even at 150° C. Calcite has been used for years in drilling fluids to form filter cakes that are subsequently removed with acid. Furthermore, amorphous PVOH solids soften and deform and have adhesive properties at high temperature-high salinity conditions, whereas particles of many other materials conventionally used as fluid loss additives are hard. The deformation and tackiness of the PVOH makes it an even better fluid loss additive and filter cake former.

The use of solid PVOH-VES fluid systems is particularly suitable in high permeability formations. High permeability formations are defined herein as having permeabilities of more than about 2 mD, especially more than about 10 mD, and most especially more than about 20 mD. For example, in addition to gravel packing, hydraulic fracturing followed by gravel-packing in a single operation, sometimes called a frac-pac (or frac-pack, fracpac, frac pac, frac and pac, or StimPac, etc.) sometimes with a deliberate tip screen-out to generate a short wide fracture (in which the proppant forms a bridge at the end of the fracture away from the wellbore, stopping the lengthening of the fracture and resulting in a subsequent increase in the fracture width) is usually performed in relatively high permeability formations for sand-control purposes. However, such operations are sometimes performed for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present invention may be used in any of these cases (gravel packing, fracturing followed by gravel packing, and fracturing for short wide fractures).

The concentration of the PVOH may range from about 0.6 g/L (about 5 ppt) to about 9.6 g/L (about 80 ppt), preferably from about 2.4 g/L (about 20 ppt) to about 7.2 g/L (about 60 ppt), but if the concentration is too low for the treatment being performed, then fluid loss may be too great. If the concentration is above about 4.8 g/L (about 40 ppt), then in most formations little or no further fluid loss is achieved. A typical formulation of a PVOH-VES system suitable for hydraulic fracturing over a broad range of temperature and formation-permeability conditions contains about 4.8 g/L (about 40 ppt) to about 6 g/L (about 50 ppt) PVOH. This composition has a salinity for the desired density, but should be above 6 weight percent salt, preferably at least 8 wt %, more preferably at least 12 wt %, up to a fluid density of 2.2 g/ml (18 lb/gal). At salinities lower than 6 wt %, dissolution of some PVOH's may occur. At salinities of 2 wt % or in fresh water, some PVOH's may dissolve very rapidly. A preferred viscoelastic surfactant fluid system, for example for fracturing and gravel packing, contains about 1 to 10 (for example about 5 to 6) volume percent of BET-E-40 (see above) (that as received in concentrated form may contain about 1% sodium polynaphthalene sulfonate). For fluid loss control pills, the VES concentration may be much higher, for example up to 50%, to prevent wellbore fluids from invading the reservoir. However any viscoelastic surfactant system may be used that is chemically compatible with the other components of the fluid, with other fluids in which it may come in contact and with the formation, and it may be used at any concentration at which it provides suitable rheology for the intended use.

In gravel packing, or combined fracturing and gravel packing, it is within the scope of the invention to apply the fluids and methods to treatments that are done with or without a screen. Although we have described the invention in terms of hydrocarbon production, it is within the scope of the invention to use the fluids and methods in wells intended for the production of other fluids such as carbon dioxide, water or brine, or in injection wells. Although we have described the invention in terms of unfoamed fluids, fluids foamed or energized (for example with nitrogen or carbon dioxide or mixtures of those gases) may be used. Adjustment of the appropriate concentrations due to any changes in the fluid properties or proppant concentration consequent to foaming would be made.

Any proppant (gravel) may be used, provided that it is compatible with the PVOH, the formation, the fluid, and the desired results of the treatment. Such proppants (gravels) may be natural or synthetic (including but not limited to glass beads, ceramic beads, sand, and bauxite), coated, or contain chemicals; more than one may be used sequentially or in mixtures of different sizes or different materials. The proppant may be resin coated, provided that the resin and any other chemicals in the coating are compatible with the other chemicals of the invention, particularly the components of the viscoelastic surfactant fluid system. Proppants and gravels in the same or different wells or treatments may be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 3 kg/L, preferably about 0.12 to about 1.44 kg/L (about 1 PPA to about 25 PPA, preferably from about 1 to about 12 PPA; PPA is "pounds proppant added" per gallon of liquid).

Also, optionally, the fracturing fluid may contain materials designed to limit proppant flowback after the fracturing operation is complete by forming a porous pack in the fracture zone. Such materials may be any known in the art, such as are available from Schlumberger under the tradename PropNET™ (for example see U.S. Pat. No. 5,501,275). Exemplary proppant flowback inhibitors include fibers or platelets of novoloid or novolbid-type polymers (U.S. Pat. No. 5,782,300).

As has been mentioned, the dissolved PVOH is also a natural breaker for viscosifiers, especially for boron-, zirconate- and titanate-crosslinked polymers and for VES systems, and this may be especially important at higher polymer loadings.

Fiber-Assisted Transport

Suitable PVOH fibers may assist in transporting, suspending and placing proppant in hydraulic fracturing and gravel packing, for example, and may then be dissolved to minimize or eliminate the presence of fibers in the proppant pack without releasing degradation products that hinder fluid flow, or prematurely decreasing the ability of otherwise suitable metal-crosslinked polymers or VES systems to viscosify the carrier fluid. As used herein, a system in which suitable PVOH fibers are used to slurry and transport proppant is referred to as "fiber-assisted transport." Where the system also includes a fluid viscosified with a suitable metal-crosslinked polymer or VES system, it will be referred to as a "fiber/polymer or viscoelastic surfactant viscosifier" system or an "FPV" system. Such systems have been described in U.S. patent application Ser. No. 11/156,966, which is hereby incorporated by reference in jurisdictions where permitted and is assigned to the assignee of the present application.

The FPV system is described herein primarily in terms of hydraulic fracturing, but it is also suitable for gravel packing, or for fracturing and gravel packing in one operation (called, for example frac and pack, frac-n-pack, frac-pack, Stimpac treatments, or other names), which are also used extensively to stimulate the production of hydrocarbons, water and other fluids from subterranean formations. These operations involve pumping a slurry of proppant (natural or synthetic materials that prop open a fracture after it is created) in hydraulic fracturing, or gravel in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

The FPV system is particularly suitable for fracturing tight gas wells, which are typically low-permeability environments with extended fracture closure times; in such cases the fracture may remain open for hours after injection ceases, and the carrier fluid may break and no longer suspend the proppant. The FPV system allows lower polymer or VES loadings, reduced fracture height growth (because of the lower viscosity that can be used), reduced proppant settling, and increased retained permeability (improved dimensionless fracture conductivity), all of which result in improved production rates. The FPV system is also particularly suitable for gravel packing when dense brines are used that contain high concentrations of calcium or other ions that would precipitate with the degradation products of some degradable fibers (for example up to 12,000 ppm calcium). The salinity in such systems may help delay PVOH fiber dissolution since the PVOH is insoluble at high salinity conditions. FPV systems with PVOH fibers are also particularly suitable for situations in which the connate water that will flow into the fracture after the treatment has a low salinity, to help solubilize and remove the PVOH from the proppant or gravel pack.

Some fibers previously used for transporting, suspending, and placing proppant, such as polyethylene terephthalate, can degrade into by-products that may precipitate salts in the presence of excessive amounts of calcium or magnesium in the connate water. Preventive measures may have heretofore been taken with other fibers, such as, but not limited to, pumping a pre-pad and/or pumping an acid or a chelating dissolver, adsorbing or absorbing an appropriate chelating agent onto or into the fiber, or incorporating precipitation inhibitors or metal scavenger ions in the fluid that prevent precipitation. With the PVOH fibers of the FPV system, screening for these cations in the connate water and applying these preventive or correction measures are not necessary.

PVOH fiber assisted transport treatments may also include slickwater (also called waterfrac) treatments (with minimal proppant and a fluid viscosity, for example, of only about 3 cP), as opposed to conventional treatments with crosslinked polymer carrier fluids that typically have viscosities of at least 100 cP, and usually much more. Treatments with PVOH fibers in the fluid may be improved if low-concentration crosslinked polymer carrier fluids or VES fluids are used, for example having a viscosity of at least about 50 cP, preferably at least about 75 cP, (at 100 sec$^{-1}$) at the temperature at which the fluid is used, especially in stiffer rocks commonly found in tight gas reservoirs, in which the higher viscosity provides increased fracture width. The FPV system with PVOH fibers de-couples proppant transport characteristics of the fluid from the fluid viscosity. It allows a much lower polymer or VES loading to be used to achieve proppant placement without sacrificing proppant coverage; this means less chance of undesired fracture height growth and means reduced fracture damage due to polymer or crosslinked polymer. The viscosity needed depends upon factors such as the stiffness of the rock; the amount, identity, size and stiffness of the fibers; the pumping rate and duration; and only to some extent on the proppant size, concentration and density. The viscosity needed can be determined by mathematical modeling or by experiments, such as those known as slot flow experiments, known in the industry. Oilfield service companies and contract testing companies can make such determinations.

If desired, the FPV system may also optionally include, in addition to the PVOH, other fibers that degrade at downhole conditions, such as, for example, substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, and fibers described in U.S. patent application Ser. Nos. 10/707,022 and 11/159,023, both of which are hereby incorporated by reference in jurisdictions where permitted and are assigned to the assignee of the present application; polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference in jurisdictions where permitted; fibers described in U.S. Patent Application Publication Nos. 2003/0134751 and 2004/0152601, both of which are hereby incorporated by reference in jurisdictions where permitted and are assigned to the assignee of the present application.

The preferred concentration of PVOH fiber in the FPV embodiment is 2.40 g/L (20 ppt) for proppant loadings of 0.12 to 0.36 kg/L (1 to 3 PPA); 3.59 g/L (30 ppt) for proppant loadings of 0.36 to 0.6 kg/L (3 to 5 PPA); and 4.80 g/L (40 ppt) for proppant loadings of over 0.6 kg/L (5 PPA). Fiber concentrations are generally ramped based on proppant concentrations. With these proppant, polymer, and fiber concentrations, the fluid stability is high enough and the proppant settling is slow enough to provide excellent fracture conductivity.

Most commonly the PVOH fiber and any other fiber are mixed with a slurry of proppant in crosslinked polymer fluid in the same way and with the same equipment as is used for fibers used for sand control and for prevention of proppant flowback, for example, but not limited to, the method described in U.S. Pat. No. 5,667,012. In fracturing, for proppant transport, suspension, and placement, the fibers are normally used with proppant or gravel laden fluids, not normally with pads, flushes or the like.

EXAMPLES

In the examples below, the following fluid formulations, PVOH's and other materials are used:

Fluid Formulations

AP#1—Surfactant Concentrate:

| Chemical Composition | Weight % |
| --- | --- |
| Propane-1,2-diol | 13.4 |
| Propan-2-ol | 20.4 |
| Water | 5.1 |
| (Z)-13 Docosenyl-N-N-bis(2-Hydroxyethyl) Methyl Ammonium Chloride | 61.1 |

AP#2—Salt-Tolerant Fracturing Fluid:

A salt tolerant fracturing fluid specially modified to be made with fresh water and to be made with low guar concentrations and low crosslinker concentrations. Contains 3 g/L (25 ppt) guar, 20 g/L (167 ppt) potassium chloride, and 2.5 mL/L (2.5 gpt) of a borate crosslinker. The borate crosslinker is an 85:15 blend containing 85% of a 20-30% glycerol solution, 10-20% sodium tetraborate decahydrate, and 60-70% water, and 15% of a solution of 30% aqueous sodium hydroxide.

AP#3—Surfactant Concentrate:

| Chemical Composition | Weight % |
| --- | --- |
| Urea | 2-3 |
| Propane-1,2-diol | 8 |
| Isopropanol | 11-12 |
| Ammonium Nitrate | 3 |
| Water | 29 |
| Quaternary Ammonium Compound | 10-30 |
| Quaternary Ammonium Compound | 10-30 |
| Alkylaryl Sulfonate | 10-30 |

AP#4—Surfactant Concentrate:

| Chemical Composition | Weight % |
| --- | --- |
| Isopropanol | 21.5-23.5 |
| Sodium Chloroacetate | <0.5 |
| Sodium Chloride | 5.3 |
| Water | 31-33 |
| Polynaphthalenesulfonate, Sodium Salt | 1-1.2 |
| Erucic Amidopropyl Dimethyl Betaine | 37.6-39.4 |

AP#5—Surfactant Concentrate:

| Chemical Composition | Weight % |
| --- | --- |
| Glycerol | 1.3-2.3 |
| Propane-1,2-diol | 14.8-16.5 |
| Sodium Chloride | 3.6-4.1 |
| Water | 41.5-51 |
| Oleoylamidopropyl dimethyl betaine | 26.2-29.5 |
| Sodium dodecylbenzene sulfonate | 2.7 |
| (2-Methoxy, methylethoxy)-propanol (DPM glycol ether) | 5.1 |

AP#6—Surfactant Concentrate:

| Chemical Composition | Weight % |
| --- | --- |
| Isopropanol | 21.5-23.5 |
| Sodium Chloroacetate | <0.5 |

-continued

| Chemical Composition | Weight % |
| --- | --- |
| Sodium Chloride | <6.1 |
| Water | 31-33 |
| Erucic Amidopropyl Dimethyl Betaine | 38.6 |

AP#7—Guar-Based Borate Crosslinked Fracturing Fluid

An aqueous guar-based borate crosslinked fracturing fluid composed of 2.4 grams guar per liter, 20 grams potassium chloride per liter, 0.5 mL of a 30 wt % solution of sodium hydroxide per liter, and 1.25 mL/L of a crosslinker blend prepared from 15 to 25% sodium tetraborate, 5 to 10% ethenyl benzene polymer with 2-methyl, 1,3 butadiene, and 70 to 80% hydrogenated light petroleum distillates.

AP#8—Guar-Based Borate Crosslinked Fracturing Fluid:

An aqueous guar-based borate crosslinked fracturing fluid composed of 4.2 grams guar per liter, 20 g potassium chloride per liter, and 1.25 mL/L of a crosslinker blend prepared from 15 to 25% sodium tetraborate, 5 to 10% ethenyl benzene polymer with 2-methyl, 1,3 butadiene, and 70 to 80% hydrogenated light petroleum distillates.

AP#9—Linear Guar-Based Fracturing Fluid:

A guar based fluid containing 20 grams potassium chloride per liter of water and guar polymer. For the example shown in FIG. 3, the guar polymer concentration varies from 0.6 g/L to 4.2 g/L (5 ppt to 35 ppt).

AP#10—Salt-Tolerant Fracturing Fluid:

A salt tolerant fracturing fluid specially designed to be made with fresh water and to be made with low guar concentrations and low crosslinker concentrations. Contains 3 g/L (25 ppt) guar, 20 g/L (167 ppt) potassium chloride, and 2.5 mL/L (2.5 gpt) of a borate crosslinker. The borate crosslinker contains 20-30% glycerol solution, 10-20% sodium tetraborate decahydrate, and 60-70% water.

PVOH's

PVOH fibers with a dissolution trigger temperature were obtained under the trade designation KURALON K-II (Kuraray). Amorphous-forming PVOH solids were obtained under the trade designation CELVOL from Celanese Chemicals.

PVOH#1—KURARAY WN5 fibers (2.2 dTex or denier, 1.5 mm), Dissolution Temperature 50° C. (122° F.)

PVOH#2—KURARAY WN8 fibers (2.2 dTex or denier, 1.5 mm), Dissolution Temperature 80° C. (176° F.)

PVOH#3—KURARAY WN4 fibers (2.2 dTex or denier, 1.5 mm), Dissolution Temperature 40° C. (104° F.)

PVOH#4—KURARAY WQ9 fibers (2.2 dTex or denier, 1.5 mm), Dissolution Temperature 95° C. (203° F.)

PVOH#5—CELVOL 523S (87-89% hydrolyzed, medium molecular weight)

PVOH#6—CELVOL 502 (87-89% hydrolyzed, low molecular weight, granules)

PVOH#7—CELVOL 205S (87-89% hydrolyzed, low/medium molecular weight, granules)

PVOH#8—CELVOL 513 (87-89% hydrolyzed, low/medium molecular weight, granules)

PVOH#9—CELVOL 523 (87-89% hydrolyzed, medium molecular weight, granules)

PVOH#10—CELVOL 418 (91-93% hydrolyzed, low/medium molecular weight, granules)

PVOH#11—CELVOL 165 (99-100% hydrolyzed, high molecular weight, granules)

PVOH#12—CELVOL 203 (87-89% hydrolyzed, low/medium molecular weight, granules)

Fluid Loss Control (VES Fluid)—In a high salt environment PVOH is in its glue-like state and can be used to control fluid loss. Then, the salt concentration of the environment can be lowered to dissolve the PVOH and clean up the surface of the formation or the filter cake. FIG. 1 shows fluid loss data obtained using a Baroid HPHT Fluid Loss Cell with 3.45 MPa (500 psi) head pressure, and a low permeability 3.5 mD core, for 6 g/L PVOH#5 (50 lb PVOH/1000 gal (ppt)) in 1 wt % AP#1 with 6 wt % KCl, followed by fluid exchange with 2 wt % KCl in deionized water. The test resulted in low fluid loss in the presence of 6% KCl. Then, upon lowering the salt concentration, the PVOH dissolved, flow though the core was restored, and fluid loss increased. The same fluid except without PVOH has virtually no fluid loss control.

Figure 2:
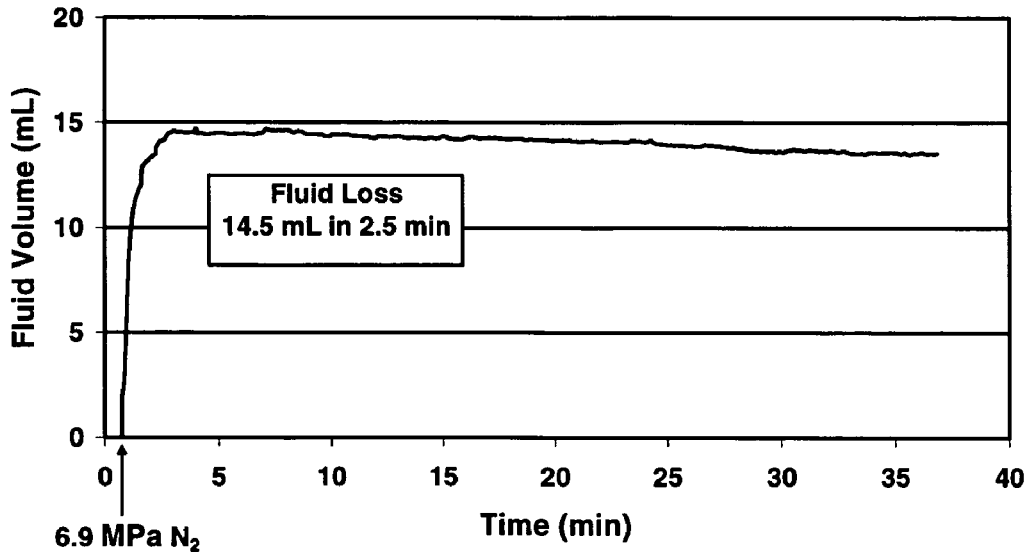
FIG. 2 is a fluid loss plot showing fluid loss control through salt concentration using polyvinyl alcohol (PVOH) with a 38.55 mD core according to one embodiment of the invention.

Fluid Loss Control (VES Fluid)—FIG. 2 shows fluid loss data conducted with 3% AP#6 containing 10% KCl and 5 g/L (0.5% or 41.5 lbs/1000 gal) PVOH#9 at 79° C. (175° F.). The core permeability was 38 mD. The dissolution temperature of PVOH#9 in water is 80° C. (176° F.). However, the high salt concentration prevented the PVOH from dissolving completely at 80° C. (176° F.). Fluid loss was 14.5 ml in 2.5 minutes with 6.9 MPa (1000 psi) head pressure after which the core remained plugged for the 30 minute duration of the test.

Conductivity (Simulated Fracture Conditions, VES Fluid and PVOH Fibers)—Fracture conductivity tests were run to verify the dissolution of PVOH fibers under simulated fracture conditions. A test with 3% AP#4 containing 5 g/L (0.5%) PVOH#2 fibers cleaned up to 507 Darcy at 116° C. (240° F.) with 20/40 mesh CarboHSP proppant. This was compared to a "sandblank" at the same conditions with a measured permeability of 539 Darcy. The retained permeability of the fluid with dissolved fibers was therefore greater than 90%.

Figure 3:
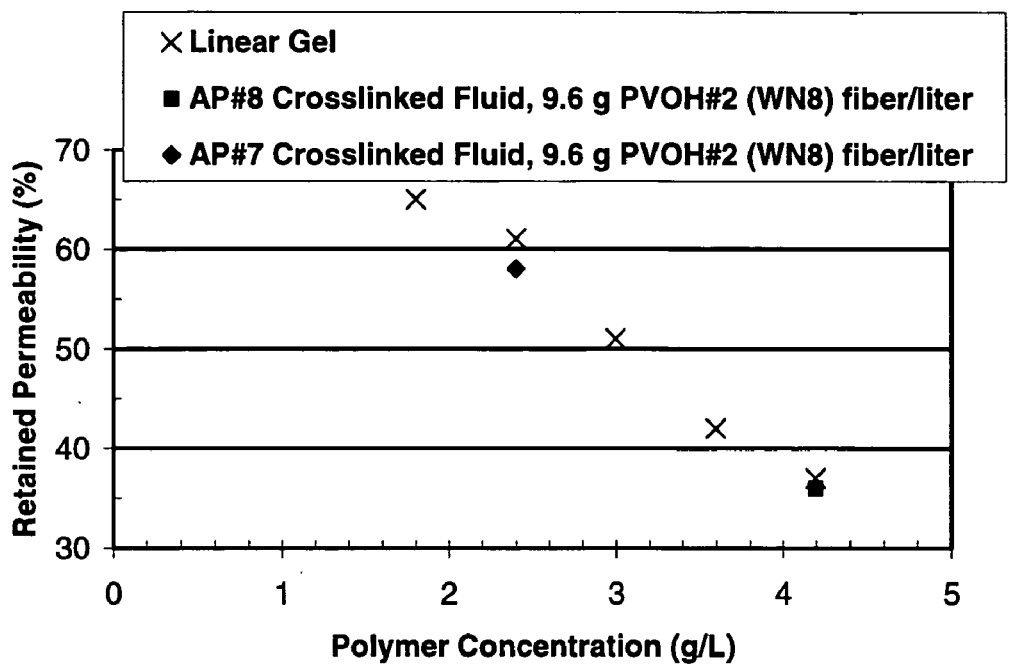
FIG. 3 is a retained permeability plot comparing conductivity of a linear gel in a simulated proppant pack with a crosslinked fluid broken with PVOH according to an embodiment of the invention.

Conductivity (Simulated Fracture Conditions, Guar and PVOH Fibers)—Fracture conductivity tests with guar demonstrated a comparable clean-up performance of crosslinked fluids with PVOH and linear gels. FIG. 3 shows data for five linear guar-based fluids (marked with an "x"), which vary in guar polymer concentration (see formulation for AP#9), and two borate crosslinked fluids (AP#7 and AP#8) containing 9.6 g/L (80 lb per 1000 gallons) PVOH#2. These tests were conducted at 93° C. (200° F.), which is above the 80° C. (176° F.) dissolution temperature of the PVOH#2 fibers in water. Retained permeability for the 2.4 gram guar polymer per liter linear gel was 61% compared to 58% for the crosslinked fluid (AP#7) containing PVOH#2 at the same polymer concentration. At a polymer concentration of 4.2 g/L, the retained permeability for the crosslinked system (AP#8) with PVOH#2 was 36% almost identical to the 37% retained permeability of the linear gel.

Figure 4:
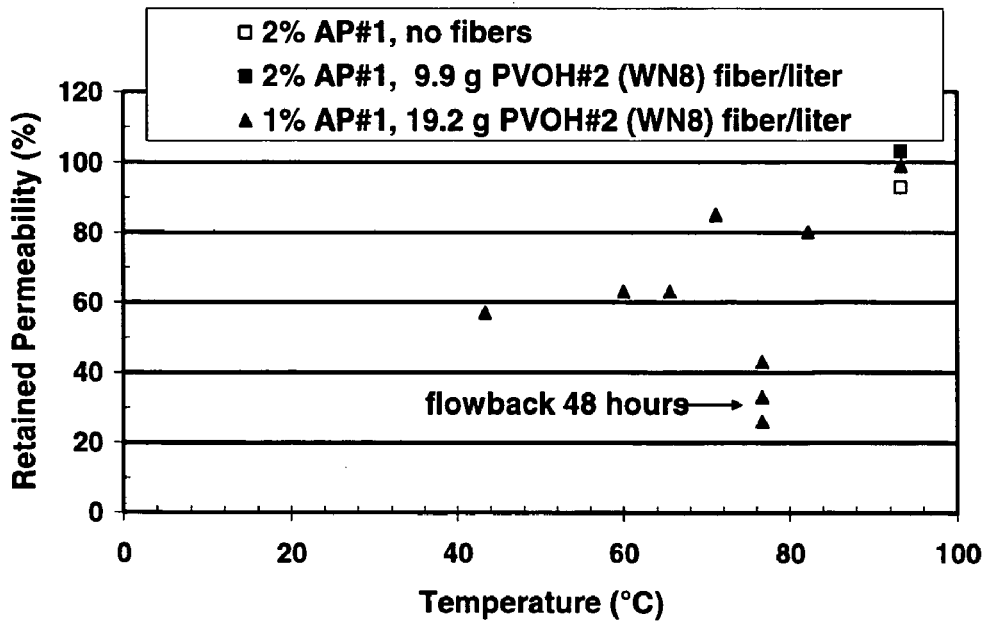
FIG. 4 is a retained permeability plot of the conductivity versus temperature of a simulated proppant pack containing PVOH fibers according to an embodiment of the invention.

Conductivity (Simulated Fracture Conditions, VES and PVOH Fibers)—FIG. 4 shows conductivity data for PVOH#2 in 1% AP#1. The dissolution temperature of the PVOH#2 fibers in water is 80° C. (176° F.). Conductivity was reduced at 77° C. (170° F.) due to the glue-like state of PVOH at this temperature. However, conductivity improved in two temperature regimes: above 82° C. (180° F.) where the PVOH fibers dissolved completely, and below 71° C. (160° F.) where the fibers remained un-dissolved. The temperature range of low conductivity between 71 to 82° C. (160 to 180° F.) is expected to shift upwards with increased fluid salinity. Introduction of a low salinity solution will dissolve PVOH and simultaneously break the polymer crosslink or VES carrier fluid, thereby increasing conductivity of the proppant pack.

Figure 5:
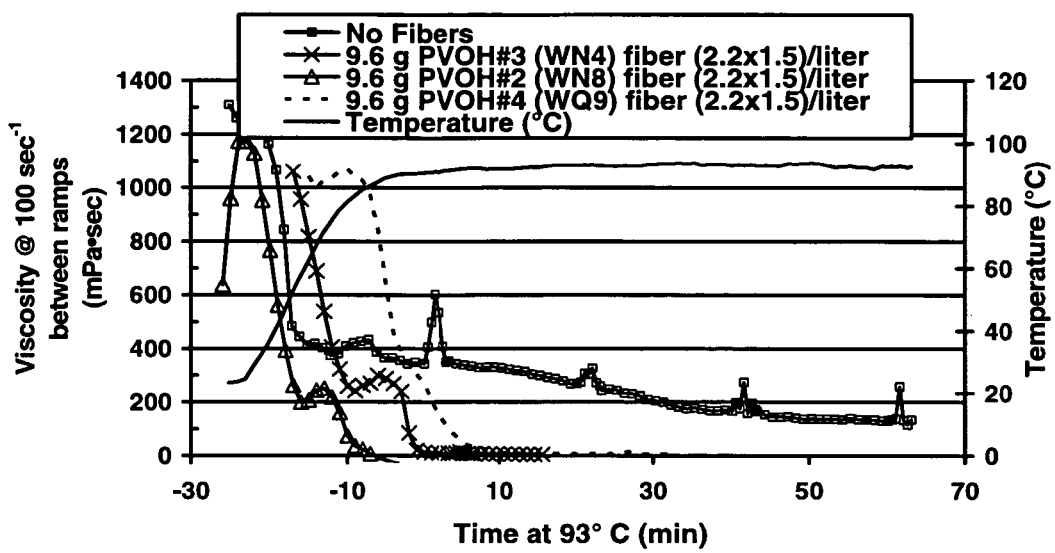
FIG. 5 is a rheological plot showing the break effect of PVOH fibers in a well treatment fluid according to embodiments of the invention.
Figure 6:
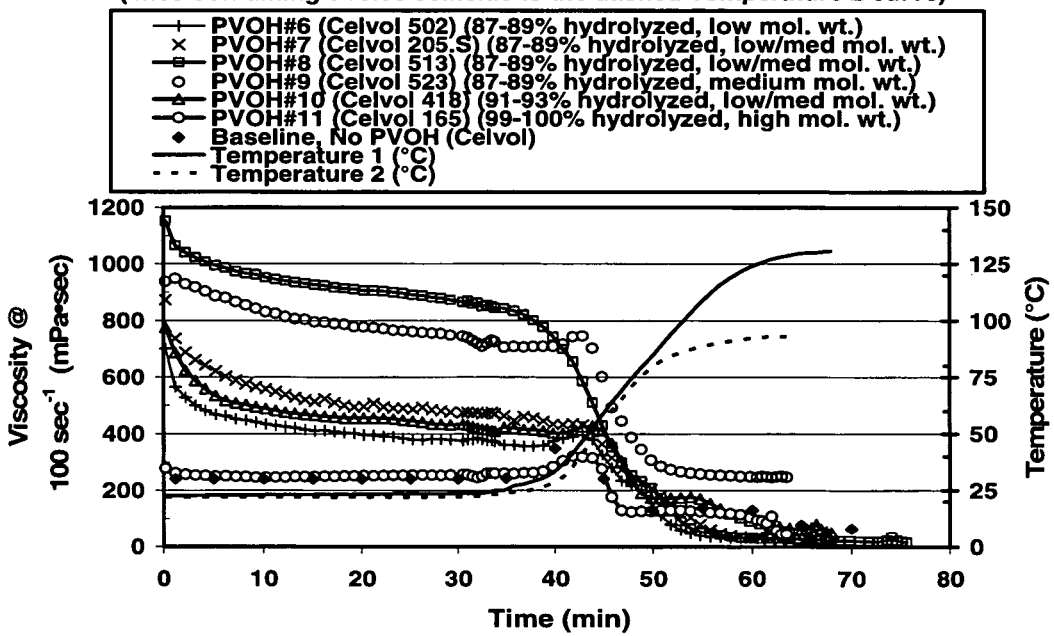
FIG. 6 is a rheological plot showing the break effect versus temperature of PVOH fibers in a well treatment fluid according to an embodiment of the invention.

Rheology (PVOH Fiber Breaker, Crosslinked Polymer Systems)—AP#1 by itself does not build a filter cake, however, polymer based fluids do build filter cakes. PVOH is an excellent breaker for borate crosslinked fluids. The hydroxyl groups of PVOH appear to strip boron ions from the crosslinked polymer, thereby un-crosslinking the polymer strands and reducing viscosity to that of linear guar solutions. FIG. 5 shows rheology data from testing several different PVOH fibers and their break affect on a borate crosslinked fracturing fluid, AP#2. FIG. 6 shows the effect of PVOH#1 fibers on the rheology of a crosslinked guar fluid (AP#10). In this case the dissolving point of the PVOH fiber was 50° C. (122° F.). Below this critical temperature the fibers increased the viscosity of the fluid. Above this temperature the dissolved fiber reduced the viscosity of the fluid. The affect of PVOH on zirconate and titanate crosslinked fluids is similar.

Figure 7:
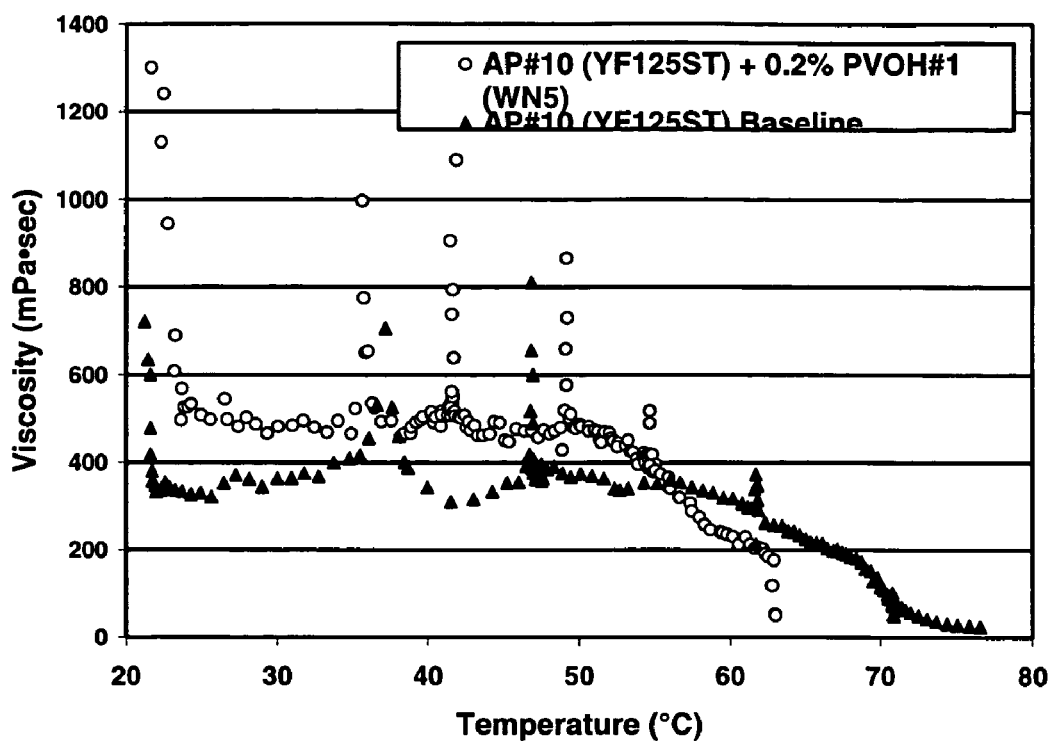
FIG. 7 is a rheological plot showing the break effect of different PVOH grades in another well treatment fluid according to embodiments of the invention.
Figure 8:
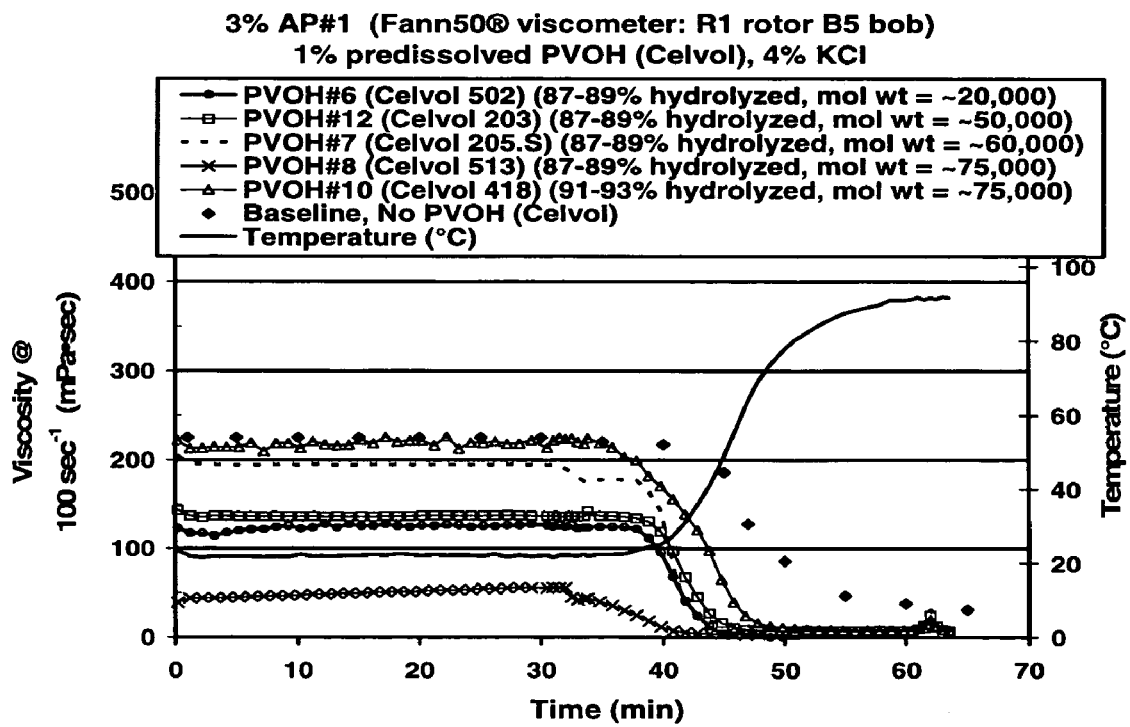
FIG. 8 is a rheological plot showing the break effect of PVOH granules and powder in a well treatment fluid according to an embodiment of the invention.

Rheology (Pre-dissolved PVOH Breaker, VES Fluids)— PVOH can also break some VES fluids. The rate at which PVOH breaks the carrier fluid depends on the dissolution temperature and the degree of hydrolysis. Several grades of PVOH granules were evaluated for their break affect on AP#1 and AP#4. In these tests, the PVOH was dissolved into the water prior to gelling with the VES additive. FIG. 7 shows that all but one grade of PVOH reduced the viscosity of 3% AP#1 at room temperature and all grades caused AP#1 to break when the fluid was heated to 38° C. (100° F.). The affect of different grades of pre-dissolved PVOH on AP#4 is shown in FIG. 8; most of the PVOH grades evaluated reduced fluid viscosity upon reaching 93° C. (200° F.).

Figure 9:
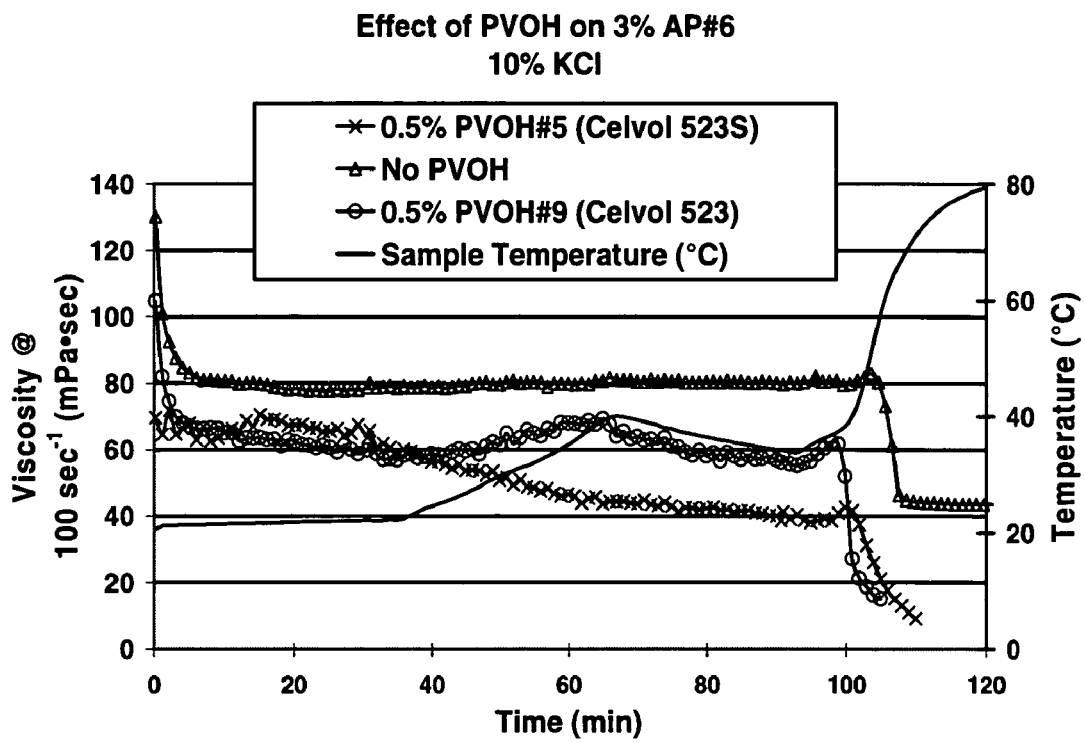
FIG. 9 is a rheological plot showing the break effect of PVOH with temperature in a VES-based well treatment fluid according to an embodiment of the invention.

Rheology (PVOH Granules/Powder Breaker, VES Fluids)—Rheology experiments were performed with 3% AP#6 as the carrier fluid in 10% KCl. The addition of PVOH#9 granules and PVOH#5 powder at concentrations of 5 g/L reduced the viscosity of AP#6 at all temperatures tested. However, good suspension performance was maintained. At low PVOH concentrations the breaking of the VES fluid occurred independently of the form of the PVOH, i.e. granules or powder, at temperatures slightly above 38° C. (100° F.), as seen in FIG. 9. Visual observations of higher concentrations of PYOH in VES fluids showed loss in viscosity at room temperature.

Figure 10:
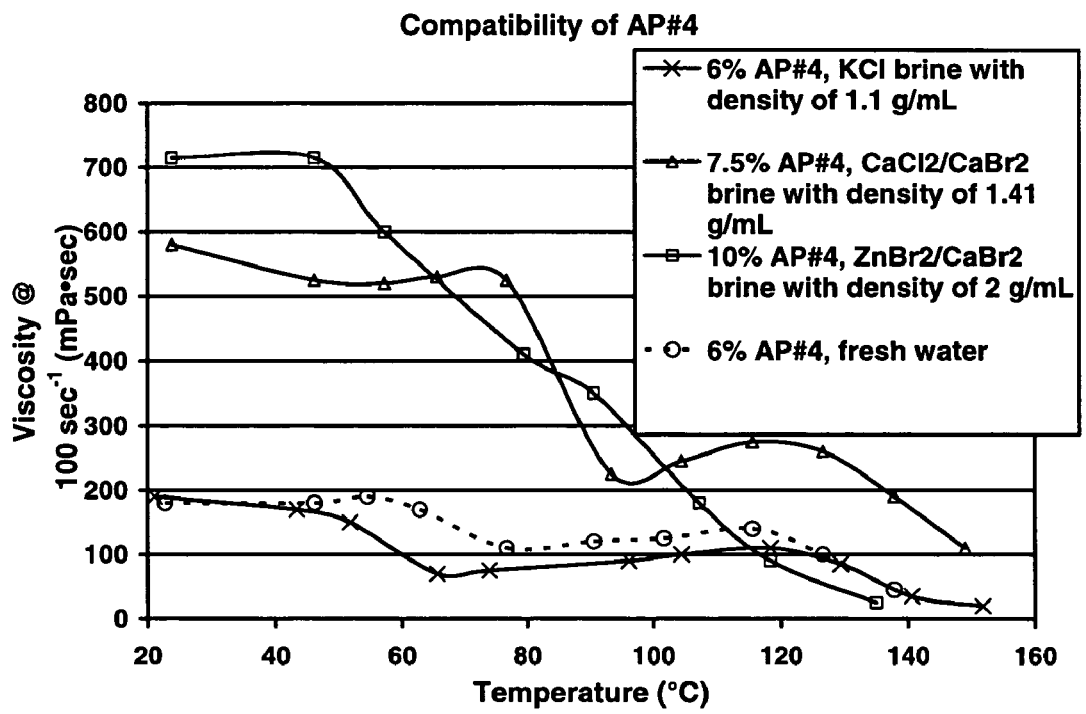
FIG. 10 is a rheological plot showing the compatibility of a viscoelastic surfactant in fresh water and brine solutions according to an embodiment of the invention.

Fluid Density (Aqueous Betaine-Type Surfactant Gel)— Aqueous gel based on betaine-type surfactants functions well in water at densities up to 2.16 g/ml (18 lb/gal) and the density can be adjusted easily. Four representative Fann50 viscosity measurements obtained for various concentrations of AP#4 in water and various brine densities are plotted in FIG. 10.

Figure 11:
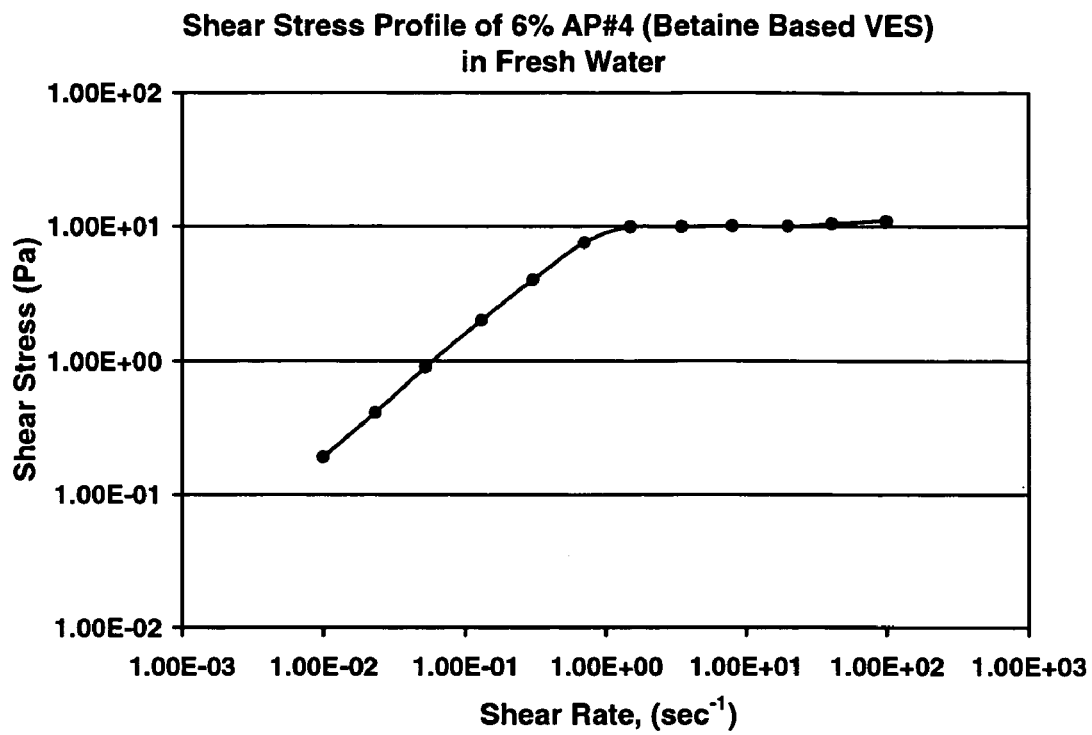
FIG. 11 is a rheological plot showing the shear stress profile of a betaine-based viscoelastic surfactant (VES) according to an embodiment of the invention.
Figure 12:
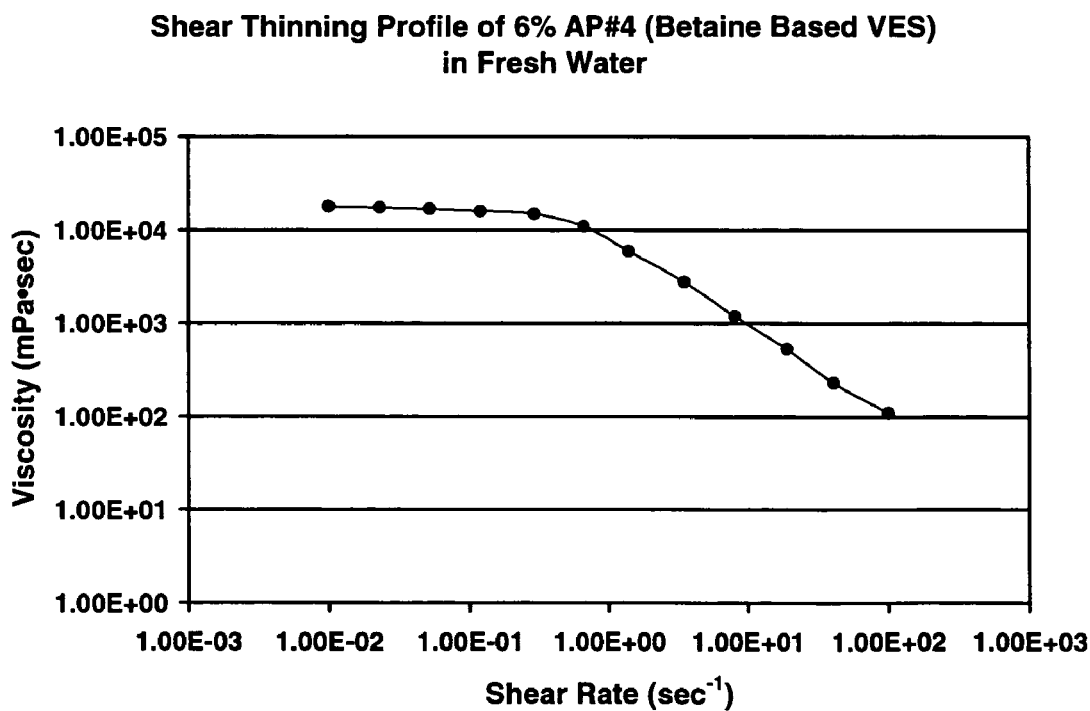
FIG. 12 is a rheological plot showing the shear thinning profile of the VES of FIG. 11 according to an embodiment of the invention.

Fluid Rheology (Cutting Transport and Friction, Betaine-Type Surfactant Gel)—Betaine based fluids have a shear-thinning profile, low plastic viscosity, high yield point, high low-shear viscosity and are not shear sensitive, as demonstrated in FIGS. 11 and 12 with 6% AP#4 in fresh-water. These are the beneficial rheological features for drilling fluids.

Figure 13:
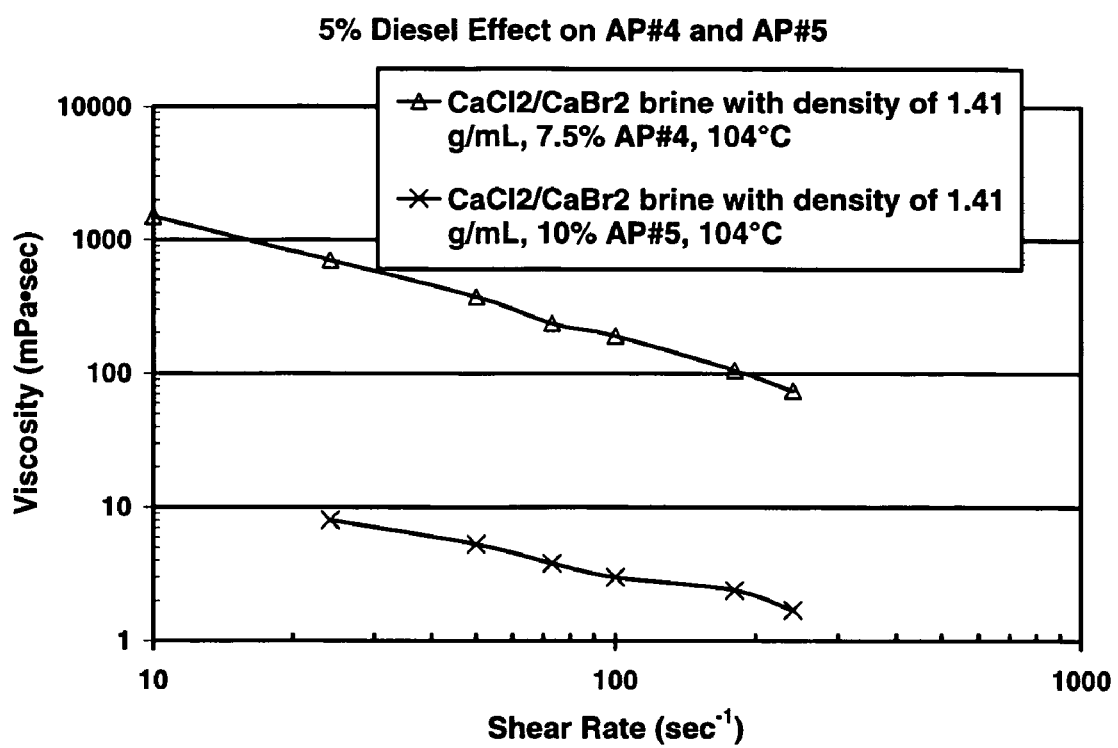
FIG. 13 is a rheological plot showing the effect of 5% diesel on the viscosity of non-betaine-based and betaine-based viscoelastic surfactant according to an embodiment of the invention.

Contaminant Tolerance (Betaine-Type Surfactant Gel)— Some surfactant-based aqueous gels can lose viscosity rapidly when contaminated with oil. The betaine-based fluid, however, can exhibit some compatibility with oil. For example 7.5% AP#4 and 10% AP#5 have comparable viscosity at 104° C. (220° F.). The rheological testing shown in FIG. 13, however, demonstrates that upon the addition of 5% diesel, the AP#4 maintains approximately 80% of its viscosity while the typical surfactant based fluid AP#5 experiences a total loss of viscosity. Typical oil concentrations in drill-in fluids are around 2 to 3 wt %.

FPV System with PVOH Fibers and Borate-Crosslinked Guar—One example of a metal-crosslinked polymer system in the "fiber/polymeric viscosifier" or FPV system with PVOH fibers is a boron crosslinked guar designed for delayed crosslinking and optimized for low guar concentrations. It is made for example with a guar or guar slurry, boric acid, solid or concentrated sodium hydroxide, and sorbitol as a stabilizer/delay agent; it may contain clay stabilizers such as potassium chloride or tetramethylammonium chloride, additional stabilizers such as sodium thiosulfate (usually obtained as the pentahydrate) and triethanolamine, bactericides, breakers, and breaker aids. An example of this fluid, used for example at temperatures below about 110° C. (about 230° F.) is made with about 2.16 g/L (18 ppt or pounds per thousand gallons) guar; 2 L/1000 L (2 gpt) of a 50% tetra methyl ammonium chloride solution in water; 1 L/1000 L (1 gpt) of a non-emulsifying agent containing about 30 to 50% of a blend of alkoxylated polyols, resins, and hydrocarbon solvents in methanol, propan-2-ol and xylene; 2 L/1000 L (2 gpt) of a surfactant containing a mixture of about 15% ethoxylated $C_{11}$ to $C_{15}$ linear and branched alcohols in water, isopropanol and ethylene glycol monobutyl ether; 0.74 g/L (6.21 ppt) boric acid; 1.74 g/L (14.52 ppt) caustic soda; 2 L/1000 L (2 gpt) of an 85% triethanolamine solution in water; and 2 L/1000 L (2 gpt) of a 48% d-sorbitol (delay agent) solution in water. The fluid may optionally also contain a conventional breaker (in addition to the PVOH) such as, but not limited to, ammonium persulfate or sodium bromate. This formulation is for example used at a guar concentration of about 1.92 g/L (about 16 ppt) to about 3.6 g/L (about 30 ppt), for example at concentrations up to about 2.88 g/L (about 24 ppt) with 1 to 2 L/1000 L (1 to 2 gpt) of the 50% tetra methyl ammonium chloride solution in water; 0-1 L/1000 L (0-1 gpt) of the surfactant described above; 1-2 L/1000 L (1-2 gpt) of the non-emulsifying agent described above; 0.74 g/L (6.21 ppt) boric acid; 1.74 g/L (14.52 ppt) caustic soda; 0-2 L/1000 L (0-2 gpt) of an 85% triethanolamine solution in water; and 1-3 L1000 L (1-3 gpt) of a 48% d-sorbitol solution in water. A typical PVOH fiber concentration would be from about 2.4 g/L (about 20 ppt) to about 4.8 g/L (about 40 ppt) PVOH.

FPV System with PVOH Fibers and Zirconate-Crosslinked Guar—Another example of a metal crosslinked polymer system is a zirconium crosslinked carboxymethyl-hydroxypropyl guar (CMHPG) that is suitable for example at temperatures between about 79° C. (about 175° F.) to about 121° C. (about 250° F.), in particular above about 110° C. (about 230° F.). This fluid is made for example with about 2.64 g/L (about 22 ppt) carboxymethylhydroxypropyl guar and about 20 g/L (167 ppt) KCl; 4 L/1000 L (4 gpt) of a 30% sodium thiosulfate solution in water (gel stabilizer); 0.1 L/1000 L (0.1 gpt) of a 75% acetic acid and 14% propan-2-ol solution in water; and 0.52 L/1000 L (0.52 gpt) of 23% zirconium lactate (crosslinker) solution in a methanol (14%)-water solution. This formulation is for example used at a carboxymethylhydroxypropyl guar concentration of about 2.64 g/L (about 22 ppt) to about 3.6 g/L (about 30 ppt) with for example about 20 to 50 g/L (about 167-417 ppt) KCl; about 2-7 L/1000 L (2-7 gpt) of a 30% sodium thiosulfate solution in water; about 0.1 to 0.12 L/1000 L (0.1 to 0.12 gpt) of a 75% acetic acid and 14% propan-2-ol solution in water; and 0.45 to 0.65 L/1000 L (0.45 to 0.65 gpt) of 23% zirconium lactate solution in a methanol (14%)-water solution; preferably at about 3.00 g/L (about 25 ppt) with 20 g/L (167 ppt) KCl; 4 L/1000 L (4 gpt) of a 30% sodium thiosulfate solution in water; 0.12 L/1000 L (0.12 gpt) of a 75% acetic acid and 14% propan-2-ol solution in water; and 0.52 L/1000 L (0.52 gpt) of 23% zirconium lactate solution in a methanol (14%)-water solution. A typical PVOH fiber concentration would be from about 2.4 g/L (about 20 ppt) to about 4.8 g/L (about 40 ppt) PVOH.

FPV System with PVOH Fibers and PVOH Viscosifier—Solutions of 1 wt % and 10 wt % PVOH in deionized water were evaluated for use as a partially viscosified carrier in the FPV system, which could include PVOH or other fibers. These solutions were mixed with 25, 30 and ~40 wt % solutions of $CaCl_2$. PVOH did not precipitate; however, the solutions produced bubbles and foamed upon shaking. A thick, gel-like foam was produced on top of the mixture with 10% PVOH in 40 wt % CaCl2 after setting for 5 days in a sealed container. While 10 wt % PVOH is reported by a PVOH manufacturer to show incipient clouding in 30% $MgCl_2$, no precipitate was observed in 30 wt % $CaCl_2$. This means that PVOH solutions can be used as the viscous carrier fluid in a method of treating a wellbore and a formation penetrated by the wellbore comprising a step of injecting a slurry of fibers and proppant in the viscous carrier fluid, wherein the viscosity of the carrier fluid in the absence of fibers is insufficient to prevent proppant settling during transport, and further wherein the fibers degrade after the treatment into products that do not precipitate in the presence of calcium or magnesium ions.

What is claimed is:

1. A well treatment method, comprising:
   injecting into a well a treatment fluid comprising insoluble polyol particles dispersed therein, wherein the polyol is not a polyester, and wherein the polyol is solubilizable upon heating, desalination or a combination thereof, and consists essentially of hydroxyl-substituted carbon atoms, in a polymer chain, spaced from adjacent hydroxyl-substituted carbon atoms by at least one atom in the polymer chain;
   maintaining insoluble conditions for the polyol particles during downhole placement; and
   a step selected from heating, desalinating and combinations thereof, for thereafter substantially dissolving the polyol particles.

2. The well treatment method of claim 1 wherein the polyol is in fiber form and comprises an at least partially crystalline polyvinyl alcohol prepared by at least partial hydrolysis of a precursor polyvinyl compound having ester substituents.

3. The well treatment method of claim 1 wherein the polyol is in fiber form and is at least partially crystalline and comprises a polymer having repeating units according to one or both of the following formulae:

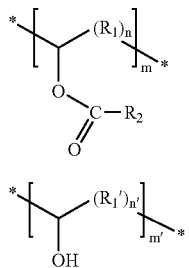

wherein $R_1$ and $R_1'$ can be the same or different, saturated or unsaturated, linear or branched alkyl chain having from 1 to 5 carbon atoms, and n and n' can be the same or different integer from 1 to 5, $R_2$ is hydrogen or saturated or unsaturated, aliphatic or aromatic, linear or branched alkyl chain having from 1 to 12 carbon atoms, m can be from 0 to 5,000, and m' can be from 100 to 10,000.

4. The well treatment method of claim 1 wherein the polyol is in fiber form and comprises an at least partially crystalline polyvinyl alcohol (PVOH) prepared by at least partial hydrolysis of polyvinyl acetate, and the well treatment fluid is injected at a temperature and salinity at which the PVOH is not substantially dissolved.

5. The well treatment method of claim 1 wherein the polyol is in fiber form, is at least partially crystalline, and is hydrophobically modified.

6. The well treatment method of claim 1 wherein the treatment fluid has a salinity effective to inhibit dissolution of the polyol at the formation temperature, and wherein the polyol is desalinated in the dissolution step.

7. The well treatment method of claim 6 wherein the salinity of the treatment fluid is at least about 2 weight percent.

8. The well treatment method of claim 6 wherein the desalination step reduces the salinity to less than about 5 weight percent.

9. The well treatment method of claim 1 wherein the polyol dissolution is into a viscosified fluid in an amount effective to break a viscosifier in the viscosified fluid.

10. The well treatment method of claim 9 wherein the viscosifier comprises a crosslinked polymer.

11. The well treatment method of claim 9 wherein the viscosifier comprises a viscoelastic surfactant system.

12. The well treatment method of claim 11 wherein the viscoelastic surfactant system comprises a surfactant selected from the group consisting of betaines and amidoamine oxides.

13. The well treatment method of claim 1 wherein the polyol particles comprise at least partially crystalline fibers soluble in fresh water above a trigger temperature.

14. The well treatment method of claim 13 wherein the treatment fluid comprises a slurry of the fibers and proppant in a viscous carrier fluid.

15. The well treatment method of claim 14 comprising fiber assisted proppant transport.

16. The well treatment method of claim 14 wherein the carrier fluid comprises a viscosifier and the dissolved polyol is a breaker for the viscosifier.

17. The well treatment method of claim 16 wherein the carrier fluid comprises saline in an amount effective to inhibit solubility of the polyol above the trigger temperature, and further comprising maintaining salinity conditions to delay dissolution of the polyol during fracture closure.

18. The well treatment method of claim 1 wherein the treatment fluid during the injection has a temperature below a trigger temperature and the downhole placement is in a formation at a temperature above the trigger temperature.

19. The well treatment method of claim 1 wherein the treatment fluid has a salinity effective to inhibit dissolution of the polyol at the formation temperature, and wherein the dissolution step comprises desalination.

20. The well treatment method of claim 1, wherein the polyol in the well treatment fluid comprises amorphous finely divided particles, the insoluble conditions comprise salinity, and the dissolution step comprises desalination.

21. The well treatment fluid of claim 20 wherein the polyol is present in the injected well treatment fluid as a superviscous phase.

22. The well treatment method of claim 20 wherein the injection comprises injecting the treatment fluid into a formation adjacent the well at a pressure sufficient to create a fracture in the formation, said fracture having opposing faces, and forming a filter cake comprising the polyol particles on a face of the fracture.

23. The well treatment method of claim 1 further comprising:

circulating the treatment fluid in the well while drilling;

forming a filter cake comprising polyol particles on a downhole surface in the well;

contacting the filter cake in a production zone with a low-salinity fluid to restore permeability; and producing fluid from a formation in the production zone.

* * * * *